United States Patent
Kato et al.

(10) Patent No.: US 7,990,337 B2
(45) Date of Patent: Aug. 2, 2011

(54) RADIO FREQUENCY IC DEVICE

(75) Inventors: Noboru Kato, Moriyama (JP); Jun Sasaki, Kyoto (JP)

(73) Assignee: Murata Manufacturing Co., Ltd., Kyoto (JP)

( * ) Notice: Subject to any disclaimer, the term of this patent is extended or adjusted under 35 U.S.C. 154(b) by 412 days.

(21) Appl. No.: 12/336,629

(22) Filed: Dec. 17, 2008

(65) Prior Publication Data
US 2009/0160719 A1    Jun. 25, 2009

Related U.S. Application Data

(60) Provisional application No. 61/016,910, filed on Dec. 27, 2007.

(30) Foreign Application Priority Data

Dec. 20, 2007 (JP) ................. 2007-329360
Jul. 7, 2008 (JP) ................. 2008-177236
Aug. 21, 2008 (JP) ................. 2008-213164

(51) Int. Cl.
*H01Q 1/36* (2006.01)
(52) U.S. Cl. ............... 343/895; 343/850; 343/700 MS
(58) Field of Classification Search .......... 343/700 MS, 343/702, 741, 895, 866, 867, 850, 860
See application file for complete search history.

(56) References Cited

U.S. PATENT DOCUMENTS

| | | |
|---|---|---|
| 3,364,564 A | 1/1968 | Kurtz et al. |
| 4,794,397 A | 12/1988 | Ohe et al. |
| 5,232,765 A | 8/1993 | Yano et al. |
| 5,253,969 A | 10/1993 | Richert |
| 5,337,063 A | 8/1994 | Takahira |
| 5,374,937 A | 12/1994 | Tsunekawa et al. |
| 5,399,060 A | 3/1995 | Richert |
| 5,491,483 A | 2/1996 | D'Hont |
| 5,757,074 A | 5/1998 | Matloubian et al. |
| 5,903,239 A | 5/1999 | Takahashi et al. |
| 5,936,150 A | 8/1999 | Kobrin et al. |
| 5,955,723 A | 9/1999 | Reiner |

(Continued)

FOREIGN PATENT DOCUMENTS

EP    0 977 145 A2    2/2000

(Continued)

OTHER PUBLICATIONS

Official communication issued in Japanese Application No. 2007-531524, mailed on Sep. 11, 2007.

(Continued)

*Primary Examiner* — HoangAnh T Le
(74) *Attorney, Agent, or Firm* — Keating & Bennett, LLP

(57) ABSTRACT

A radio frequency IC device includes a radio frequency IC chip, a feeder circuit substrate, and a radiating plate. The feeder circuit substrate includes a feeder circuit that electrically connects to the radio IC chip and that includes a resonance circuit and/or a matching circuit including inductance elements. The feeder circuit substrate is bonded to the radiating plate, which radiates a transmission signal supplied from the feeder circuit and supplies a received signal to the feeder circuit. The inductance elements are arranged in spiral patterns wound in opposite directions and couple to each other in opposite phases. The radio frequency IC device is able to obtain a radio frequency IC device that is not susceptible to being affected by a usage environment, minimizes variations in radiation characteristics, and can be used in a wide frequency band.

21 Claims, 27 Drawing Sheets

U.S. PATENT DOCUMENTS

| | | | |
|---|---|---|---|
| 5,995,006 | A | 11/1999 | Walsh |
| 6,104,311 | A | 8/2000 | Lastinger |
| 6,107,920 | A | 8/2000 | Eberhardt et al. |
| 6,172,608 | B1 | 1/2001 | Cole |
| 6,181,287 | B1 | 1/2001 | Beigel |
| 6,190,942 | B1 | 2/2001 | Wilm et al. |
| 6,259,369 | B1 | 7/2001 | Monico |
| 6,271,803 | B1 | 8/2001 | Watanabe et al. |
| 6,335,686 | B1 | 1/2002 | Goff et al. |
| 6,362,784 | B1 | 3/2002 | Kane et al. |
| 6,367,143 | B1 | 4/2002 | Sugimura |
| 6,378,774 | B1 | 4/2002 | Emori et al. |
| 6,406,990 | B1 | 6/2002 | Kawai |
| 6,448,874 | B1 | 9/2002 | Shiino et al. |
| 6,462,716 | B1 | 10/2002 | Kushihi |
| 6,542,050 | B1 | 4/2003 | Arai et al. |
| 6,600,459 | B2 | 7/2003 | Yokoshima et al. |
| 6,634,564 | B2 | 10/2003 | Kuramochi |
| 6,664,645 | B2 | 12/2003 | Kawai |
| 6,763,254 | B2 | 7/2004 | Nishikawa |
| 6,828,881 | B2 | 12/2004 | Mizutani et al. |
| 6,927,738 | B2 | 8/2005 | Senba et al. |
| 6,963,729 | B2 | 11/2005 | Uozumi |
| 7,088,307 | B2 | 8/2006 | Imaizumi |
| 7,112,952 | B2 | 9/2006 | Arai et al. |
| 7,119,693 | B1 | 10/2006 | Devilbiss |
| 7,129,834 | B2 | 10/2006 | Naruse et al. |
| 7,248,221 | B2 | 7/2007 | Kai et al. |
| 7,250,910 | B2 | 7/2007 | Yoshikawa et al. |
| 7,276,929 | B2 | 10/2007 | Arai et al. |
| 7,317,396 | B2 | 1/2008 | Ujino |
| 7,405,664 | B2 | 7/2008 | Sakama et al. |
| 2002/0011967 | A1 | 1/2002 | Goff et al. |
| 2002/0044092 | A1 | 4/2002 | Kushihi |
| 2002/0067316 | A1 | 6/2002 | Yokoshima et al. |
| 2004/0001027 | A1 | 1/2004 | Killen et al. |
| 2004/0217915 | A1 | 11/2004 | Imaizumi |
| 2004/0219956 | A1 | 11/2004 | Iwai et al. |
| 2004/0227673 | A1 | 11/2004 | Iwai et al. |
| 2005/0092836 | A1 | 5/2005 | Kudo |
| 2005/0099337 | A1 | 5/2005 | Takei et al. |
| 2005/0125093 | A1 | 6/2005 | Kikuchi et al. |
| 2005/0140512 | A1 | 6/2005 | Sakama et al. |
| 2005/0232412 | A1 | 10/2005 | Ichihara et al. |
| 2005/0236623 | A1 | 10/2005 | Takechi et al. |
| 2005/0275539 | A1 | 12/2005 | Sakama et al. |
| 2006/0001138 | A1 | 1/2006 | Sakama et al. |
| 2006/0055601 | A1 | 3/2006 | Kameda et al. |
| 2006/0071084 | A1 | 4/2006 | Detig et al. |
| 2006/0109185 | A1 | 5/2006 | Iwai et al. |
| 2006/0158380 | A1 | 7/2006 | Son et al. |
| 2006/0267138 | A1 | 11/2006 | Kobayashi |
| 2007/0004028 | A1 | 1/2007 | Lair et al. |
| 2007/0018893 | A1 | 1/2007 | Kai et al. |
| 2007/0040028 | A1 | 2/2007 | Kawamata |
| 2007/0052613 | A1 | 3/2007 | Gallschuetz et al. |
| 2007/0115182 | A1* | 5/2007 | Chen et al. ............ 343/700 MS |
| 2007/0164414 | A1 | 7/2007 | Dokai et al. |
| 2007/0252700 | A1 | 11/2007 | Ishihara et al. |
| 2007/0285335 | A1 | 12/2007 | Bungo et al. |
| 2008/0024156 | A1 | 1/2008 | Arai et al. |
| 2008/0122724 | A1 | 5/2008 | Kato |
| 2008/0169905 | A1 | 7/2008 | Slatter |
| 2008/0246664 | A1* | 10/2008 | Ikemoto et al. ........ 343/700 MS |
| 2008/0272885 | A1 | 11/2008 | Atherton |
| 2009/0002130 | A1 | 1/2009 | Kato |
| 2009/0152362 | A1* | 6/2009 | Ayala et al. .................. 235/492 |

FOREIGN PATENT DOCUMENTS

| | | |
|---|---|---|
| JP | 50-143451 A | 11/1975 |
| JP | 62-127140 U | 8/1987 |
| JP | 05-327331 A | 12/1993 |
| JP | 6-53733 A | 2/1994 |
| JP | 06-077729 A | 3/1994 |
| JP | 06-177635 A | 6/1994 |
| JP | 07-183836 A | 7/1995 |
| JP | 08-056113 A | 2/1996 |
| JP | 8-87580 A | 4/1996 |
| JP | 11-149537 A | 6/1996 |
| JP | 08-279027 A | 10/1996 |
| JP | 08-307126 A | 11/1996 |
| JP | 08-330372 A | 12/1996 |
| JP | 09-014150 A | 1/1997 |
| JP | 09-245381 A | 9/1997 |
| JP | 09-252217 A | 9/1997 |
| JP | 09-270623 A | 10/1997 |
| JP | 10-505466 A | 5/1998 |
| JP | 10-171954 A | 6/1998 |
| JP | 10-293828 A | 11/1998 |
| JP | 11-149538 A | 6/1999 |
| JP | 11-219420 A | 8/1999 |
| JP | 11-328352 A | 11/1999 |
| JP | 11-346114 A | 12/1999 |
| JP | 11-515094 A | 12/1999 |
| JP | 2000-21128 A | 1/2000 |
| JP | 2000-021639 A | 1/2000 |
| JP | 2000-022421 A | 1/2000 |
| JP | 2005-229474 A | 1/2000 |
| JP | 2000-059260 A | 2/2000 |
| JP | 2000-085283 A | 3/2000 |
| JP | 2000-132643 A | 5/2000 |
| JP | 2000-137778 A | 5/2000 |
| JP | 2000-148948 A | 5/2000 |
| JP | 2000-172812 A | 6/2000 |
| JP | 2000-510271 A | 8/2000 |
| JP | 2000-276569 A | 10/2000 |
| JP | 2000-286634 A | 10/2000 |
| JP | 2000-286760 A | 10/2000 |
| JP | 2000-311226 A | 11/2000 |
| JP | 2000-321984 A | 11/2000 |
| JP | 2001-028036 A | 1/2001 |
| JP | 2007-18067 A | 1/2001 |
| JP | 2001-66990 A | 3/2001 |
| JP | 2001-168628 A | 6/2001 |
| JP | 2001-256457 A | 9/2001 |
| JP | 2001-514777 A | 9/2001 |
| JP | 2001-319380 A | 11/2001 |
| JP | 2001-331976 A | 11/2001 |
| JP | 2001-332923 A | 11/2001 |
| JP | 2001-344574 A | 12/2001 |
| JP | 2001-351084 A | 12/2001 |
| JP | 2002-024776 A | 1/2002 |
| JP | 2002-042076 A | 2/2002 |
| JP | 2002-505645 A | 2/2002 |
| JP | 2002-76750 A | 3/2002 |
| JP | 2002-150245 A | 5/2002 |
| JP | 2002-175508 A | 6/2002 |
| JP | 2002-183690 A | 6/2002 |
| JP | 2002-185358 A | 6/2002 |
| JP | 2002-204117 A | 7/2002 |
| JP | 2002-230128 A | 8/2002 |
| JP | 2002-298109 A | 10/2002 |
| JP | 2002-319008 A | 10/2002 |
| JP | 2002-362613 A | 12/2002 |
| JP | 2002-373029 A | 12/2002 |
| JP | 2002-373323 A | 12/2002 |
| JP | 2003-016412 A | 1/2003 |
| JP | 2003-030612 A | 1/2003 |
| JP | 2003-44789 A | 2/2003 |
| JP | 2003-58840 A | 2/2003 |
| JP | 2003-067711 A | 3/2003 |
| JP | 2003-076947 A | 3/2003 |
| JP | 2003-085501 A | 3/2003 |
| JP | 2003-085520 A | 3/2003 |
| JP | 2003-87008 A | 3/2003 |
| JP | 2003-87044 A | 3/2003 |
| JP | 2003-099720 A | 4/2003 |
| JP | 2003-099721 A | 4/2003 |
| JP | 2003-110344 A | 4/2003 |
| JP | 2003-132330 A | 5/2003 |
| JP | 2003-134007 A | 5/2003 |
| JP | 2003-155062 A | 5/2003 |
| JP | 2003-158414 A | 5/2003 |
| JP | 2003-187207 A | 7/2003 |
| JP | 2003-187211 A | 7/2003 |
| JP | 2003-198230 A | 7/2003 |

| | | | |
|---|---|---|---|
| JP | 2003-209421 A | 7/2003 | |
| JP | 2003-218624 A | 7/2003 | |
| JP | 2003-233780 A | 8/2003 | |
| JP | 2003-242471 A | 8/2003 | |
| JP | 2003-243918 A | 8/2003 | |
| JP | 2003-288560 A | 10/2003 | |
| JP | 2003-309418 A | 10/2003 | |
| JP | 2003-332820 A | 11/2003 | |
| JP | 2004-88218 A | 3/2004 | |
| JP | 2004-096566 A | 3/2004 | |
| JP | 2004-253858 A | 9/2004 | |
| JP | 2004-287767 A | 10/2004 | |
| JP | 2004-297249 A | 10/2004 | |
| JP | 2004-326380 A | 11/2004 | |
| JP | 2004-334268 A | 11/2004 | |
| JP | 2004-336250 A | 11/2004 | |
| JP | 2004-343000 A | 12/2004 | |
| JP | 2004-362190 A | 12/2004 | |
| JP | 2004-362341 A | 12/2004 | |
| JP | 2004-362602 A | 12/2004 | |
| JP | 2005-136528 A | 5/2005 | |
| JP | 2005-165839 A | 6/2005 | |
| JP | 2005-167327 A | 6/2005 | |
| JP | 2005-191705 A | 7/2005 | |
| JP | 2005-210676 A | 8/2005 | |
| JP | 2005-210680 A | 8/2005 | |
| JP | 2005-217822 A | 8/2005 | |
| JP | 2005-236339 A | 9/2005 | |
| JP | 2005-244778 A | 9/2005 | |
| JP | 2005-275870 A | 10/2005 | |
| JP | 2005-295135 A | 10/2005 | |
| JP | 2005-311205 A | 11/2005 | |
| JP | 2005-321305 A | 11/2005 | |
| JP | 2005-335755 A | 12/2005 | |
| JP | 2005-346820 A | 12/2005 | |
| JP | 2005-352858 A | 12/2005 | |
| JP | 2006-031766 A | 2/2006 | |
| JP | 2006-39902 A | 2/2006 | |
| JP | 2006-67479 A | 3/2006 | |
| JP | 2006-72706 A | 3/2006 | |
| JP | 2006-80367 A | 3/2006 | |
| JP | 2006-92630 A | 4/2006 | |
| JP | 2006-102953 A | 4/2006 | |
| JP | 2006-148518 A | 6/2006 | |
| JP | 2006-195795 A | 7/2006 | |
| JP | 2006-270212 A | 10/2006 | |
| JP | 2006-309401 A | 11/2006 | |
| JP | 2007-65822 A | 3/2007 | |
| JP | 2007-150868 A | 6/2007 | |
| JP | 11-175678 A | 1/2009 | |
| NL | 9100176 A | 3/1992 | |
| NL | 9100347 A | 3/1992 | |
| WO | 03/079305 A1 | 9/2003 | |
| WO | 2004/036772 A1 | 4/2004 | |
| WO | 2004/070879 A | 8/2004 | |
| WO | 2004/072892 A1 | 8/2004 | |
| WO | 2005/073937 A | 8/2005 | |
| WO | 2005/115849 A1 | 12/2005 | |
| WO | 2006/045682 A | 5/2006 | |
| WO | 2007/083574 A1 | 7/2007 | |
| WO | 2007/119310 A1 | 10/2007 | |

OTHER PUBLICATIONS

Official communication issued in Japanese Application No. 2007-531525, mailed on Sep. 25, 2007.
Official communication issued in Japanese Application No. 2007-531524, mailed on Dec. 12, 2007.
Official communication issued in European Application No. 07706650.4, mailed on Nov. 24, 2008.
Dokai et al.: "Wireless IC Device and Component for Wireless IC Device," U.S. Appl. No. 11/624,382, filed Jan. 18, 2007.
Dokai et al.: "Wireless IC Device, and Component for Wireless IC Device," U.S. Appl. No. 11/930,818, filed Oct. 31, 2007.
Kato et al.: "Wireless IC Device," U.S. Appl. No. 12/042,399, filed Mar. 5, 2008.
Official communication issued in related U.S. Appl. No. 12/042,399; mailed on Aug. 25, 2008.
English translation of NL9100176, published on Mar. 2, 1992.
English translation of NL9100347, published on Mar. 2, 1992.
Kato et al.: "Antenna," U.S. Appl. No. 11/928,502, filed Oct. 30, 2007.
Kato et al.: Wireless IC Device, U.S. Appl. No. 12/211,117, filed Sep. 16, 2008.
Kato et al.: "Antenna," U.S. Appl. No. 11/688,290, filed Mar. 20, 2007.
Kato et al.: "Electromagnetic-Coupling-Module-Attached Article," U.S. Appl. No. 11/740,509, filed Apr. 26, 2007.
Kato et al.: "Product Including Power Supply Circuit Board," U.S. Appl. No. 12/234,949, filed Sep. 22, 2008.
Kato et al.: "Data Coupler," U.S. Appl. No. 12/252,475, filed Oct. 16, 2008.
Kato et al.; "Information Terminal Device," U.S. Appl. No. 12/267,666, filed Nov. 10, 2008.
Kato et al.: "Wireless IC Device and Wireless IC Device Composite Component," U.S. Appl. No. 12/276,444, filed Nov. 24, 2008.
Dokai et al.: "Optical Disc," U.S. Appl. No. 12/326,916, filed Dec. 3, 2008.
Dokai et al.: "System for Inspecting Electromagnetic Coupling Modules and Radio IC Devices and Method for Manufacturing Electromagnetic Coupling Modules and Radio IC Devices Using the System," U.S. Appl. No. 12/274,400, filed Nov. 20, 2008.
Kato: "Wireless IC Device," U.S. Appl. No. 11/964,185, filed Dec. 26, 2007.
Dokai et al.: "Wireless IC Device and Component for Wireless IC Device," U.S. Appl. No. 12/359,690, filed Jan. 26, 2009.
Kato et al.: "Wireless IC Device and Component for Wireless IC Device," U.S. Appl. No. 12/339,198, filed Dec. 19, 2008.
Ikemoto et al.: "Wireless IC Device," U.S. Appl. No. 11/851,651, filed Sep. 7, 2007.
Kataya et al.: "Wireless IC Device and Electronic Device," U.S. Appl. No. 11/851,661, filed Sep. 7, 2007.
Dokai et al.: "Antenna and Radio IC Device," U.S. Appl. No. 12/350,307, filed Jan. 8, 2009.
Official communication issued in counterpart International Application No. PCT/JP2008/072260, mailed on Mar. 10, 2009.
Official Communication issued in corresponding European Patent Application No. 08865022.1, mailed on Jul. 20, 2010.

* cited by examiner

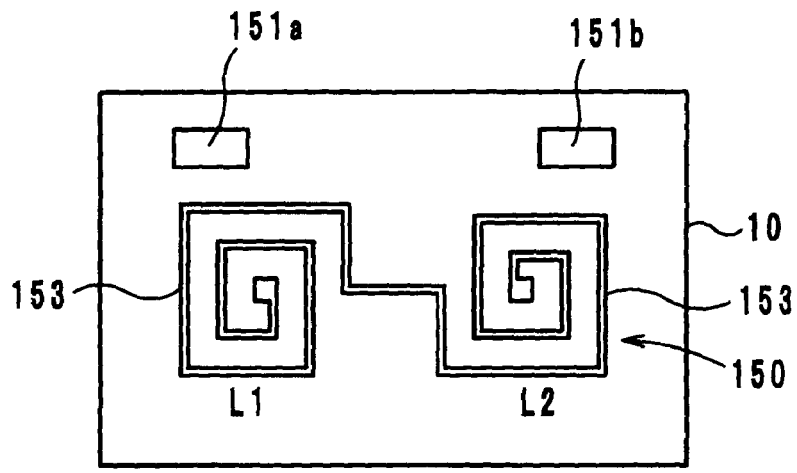
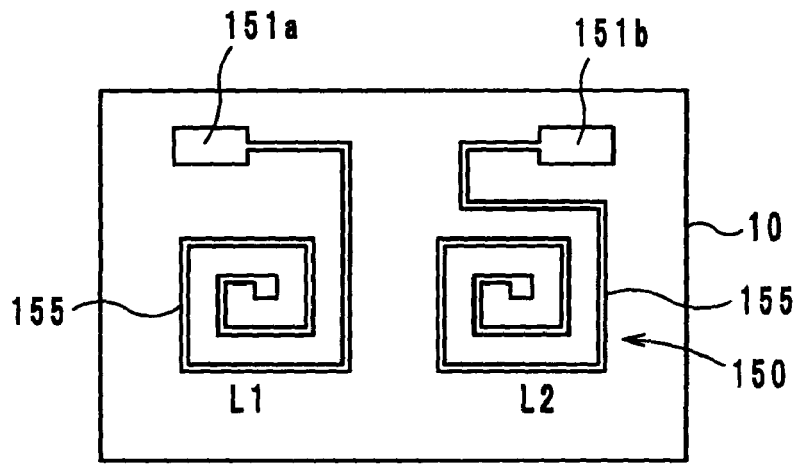
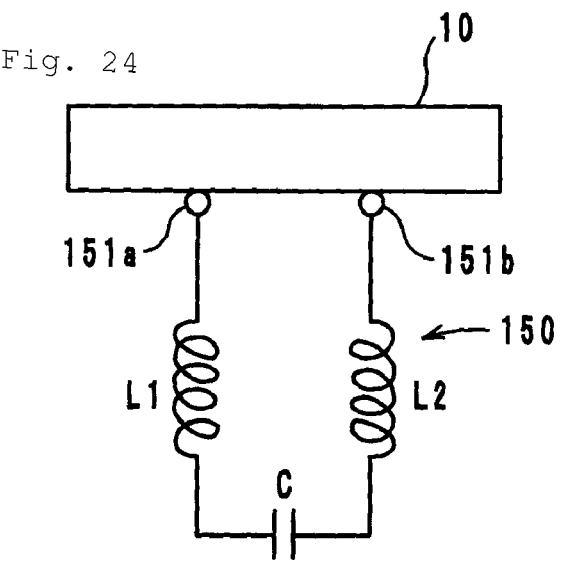

Fig. 29A
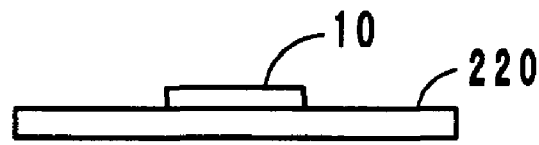
Fig. 29B
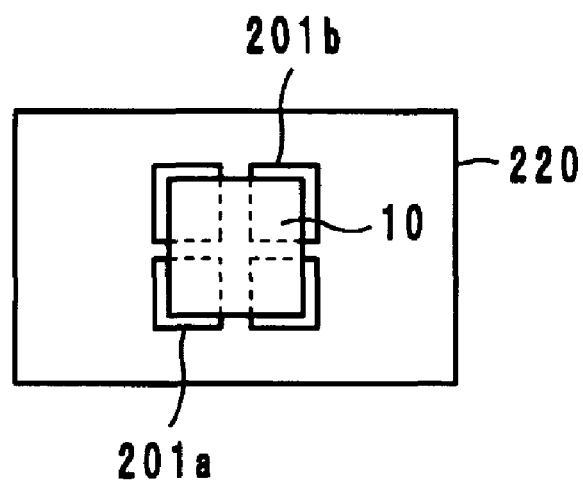
Fig. 29C 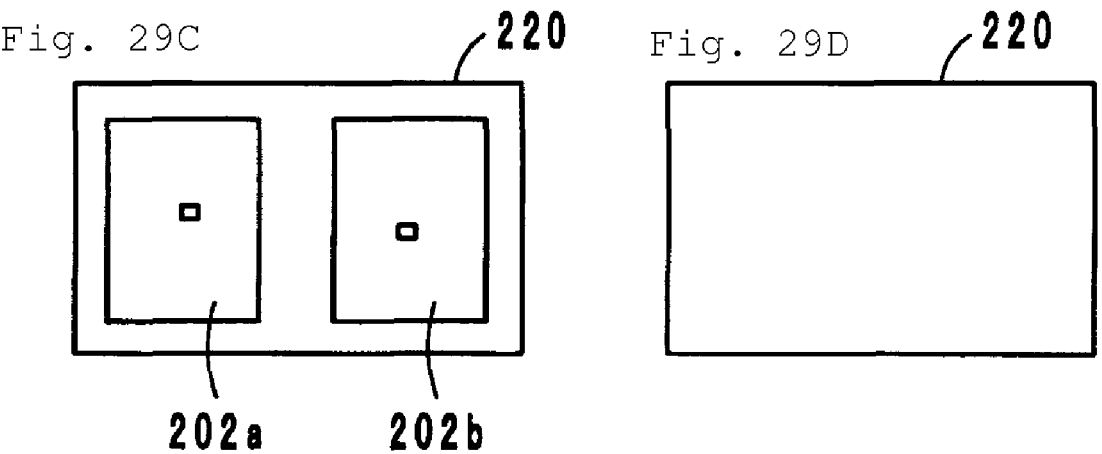 Fig. 29D

Fig. 31A
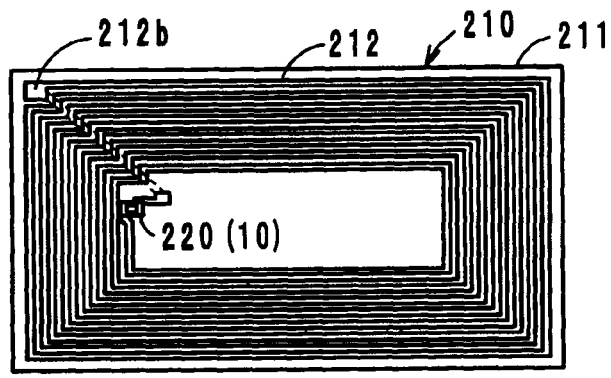
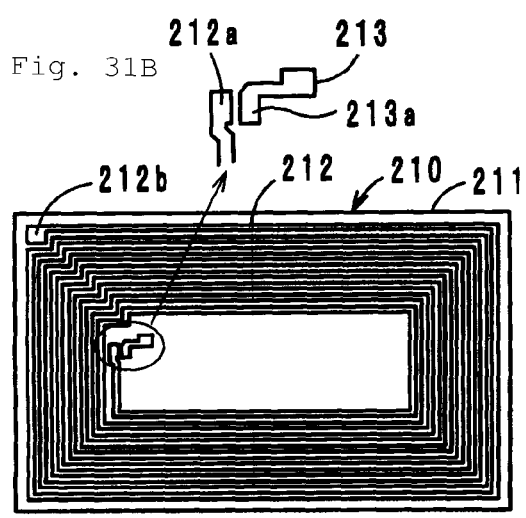
Fig. 31B
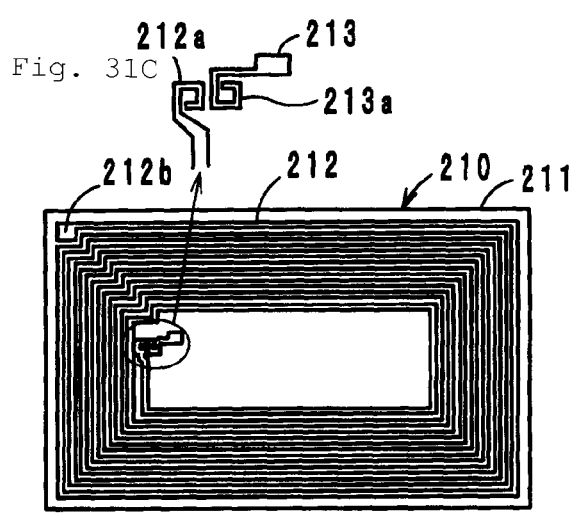
Fig. 31C
Fig. 31D
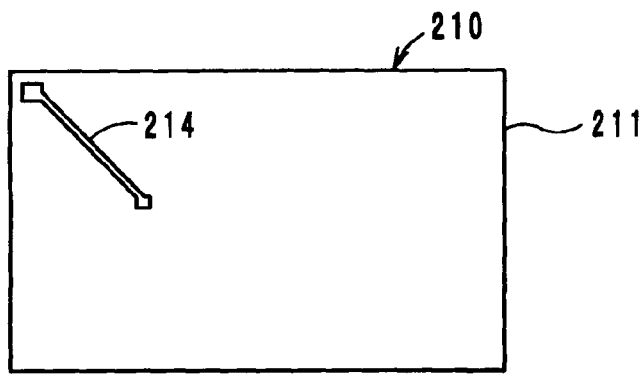

RADIO FREQUENCY IC DEVICE

BACKGROUND OF THE INVENTION

1. Field of the Invention

The present invention relates to a radio frequency IC (integrated circuit) device. More particularly, the present invention relates to a radio frequency IC device used in a RFID (radio frequency identification) system.

2. Description of the Related Art

Previous RFID systems have been developed as a system to manage articles. In this RFID system, a reader/writer generating an induction field and a radio frequency tag (also called a radio frequency IC device) that is attached to an article and that stores predetermined information communicate with each other in a non-contact manner to transmit information. As a radio frequency tag used in this type of RFID system, Japanese Unexamined Patent Application Publication No. 2006-80367 suggests a radio frequency tag including an antenna and a matching circuit placed on a flexible substrate and an IC chip electrically continuous to the antenna and the matching circuit. In this tag, the matching circuit is constituted by forming a loop coil (inductor) on the substrate.

However, in the radio frequency tag described in Japanese Unexamined Patent Application Publication No. 2006-80367, the matching circuit to perform impedance matching between the IC chip and the antenna is exposed on the flexible substrate. This configuration has a disadvantage of causing variations in inductance of the loop coil and in characteristics of the matching circuit depending on the permittivity of the article to which the radio frequency tag is attached or the circumstances of the article. These variations cause transmission loss of signals between the IC chip and the antenna, resulting in disadvantageous degradation of radiation characteristics of the antenna. On the other hand, the usable frequency of the radio frequency tag is determined depending on the length of the antenna. The antenna needs to be designed in accordance with the permittivity and other characteristics of the article to which the antenna is to be attached, which is very inconvenient.

SUMMARY OF THE INVENTION

In order to overcome the problems described above, preferred embodiments of the present invention provide a radio frequency IC device that is not susceptible to being affected by a usage environment, that can prevent variations in radiation characteristics, and that can be used in a wide frequency band.

A radio frequency device according to a preferred embodiment of the present invention includes a radio frequency IC chip, a feeder circuit substrate electrically connected to the radio frequency IC chip and provided with a feeder circuit including a resonance circuit and/or a matching circuit including at least two inductance elements, and a radiating plate to radiate a transmission signal supplied from the feeder circuit and/or supply a received signal to the feeder circuit, the feeder circuit substrate being bonded to or placed near the radiating plate. The at least two inductance elements are arranged in spiral patterns wound in opposite directions.

In the radio frequency IC device according to a preferred embodiment of the present invention, a resonance frequency of a signal is set in the feeder circuit provided in the feeder circuit substrate. Thus, the radio frequency IC device normally operates when being attached to various articles, variations in radiation characteristic are prevented, and there is no need to change the design of the radiating plate for individual articles. Particularly, the at least two inductance elements provided in the feeder circuit substrate are wound in opposite directions, and thus magnetic fields generated by the inductance elements are canceled out, a Q value becomes small with no steepness in resonance characteristic, and thus a wideband characteristic can be obtained near the resonance frequency. Also, the directions of the magnetic fields are opposite of one another. That is, when one of the magnetic fields is directed upward, the other is directed downward. This corresponds to positive and negative of an AC supply, enabling almost 100% energy transmission to the radiating plate via magnetic field energy.

The frequency of a transmission signal radiated from the radiating plate and the frequency of a reception signal supplied to the radio frequency IC chip substantially correspond to the resonance frequency of the resonance circuit in the feeder circuit substrate. A maximum gain of the signals is substantially determined by at least one of the size and shape of the feeder circuit and the distance and medium between the feeder circuit and the radiating plate. Since the frequencies of the transmission/reception signals are determined in the feeder circuit substrate, a stable frequency characteristic can be obtained while preventing a change in the frequency characteristic in any shape or size of the radiating plate and a positional relationship, for example, even if the radio frequency IC device is rolled or is sandwiched by dielectrics.

In a radio frequency IC device according to a preferred embodiment of the present invention, the at least two inductance elements may be placed in different positions when the feeder circuit substrate is viewed in a perspective plan view. The feeder circuit can be coupled to two different radiating plates.

Each of the at least two inductance elements may preferably be defined by two wiring electrodes adjacent to each other on the same plane. When one inductance element is constituted by two adjacent wiring electrodes, a wideband resonance characteristic can be obtained by changing the length of the wiring electrodes or the gap therebetween.

The feeder circuit substrate may include a laminate and the inside or surface of a bottom layer of the laminate may be provided with flat electrodes, the size thereof being the about the same as, or smaller than that of an outer shape of the at least two inductance elements when the feeder circuit substrate is viewed in a perspective plan view. By providing the flat electrodes, variations in coupling between the feeder circuit and the radiating plate can be minimized.

The feeder circuit substrate may preferably include a magnetic substance and the at least two inductance elements may be placed in the magnetic substance. By providing the magnetic substance in the feeder circuit substrate, a large inductance value can be obtained to deal with a frequency of an approximately 13.56 MHz band, for example.

The radiating plate may be defined by a loop-shaped electrode two ends that may couple to one of the at least two inductance elements. Also, a magnetic substance may be placed inside or on a surface of a loop of the loop-shaped electrode. With this configuration, a magnetic field generated by the radiating plate including the loop-shaped electrode is amplified and the transmission distance increases.

The at least two inductance elements may connect to the radio frequency IC chip in series or in parallel. Also, inductance values of the at least two inductance elements may be the same or substantially the same.

A plurality of mount electrodes arranged to mount the radio frequency IC chip may be located on a principal surface of the feeder circuit substrate and at least two of the plurality of mount electrodes may be electrically in conduction via the feeder circuit. The at least two mount electrodes may be balanced input/output terminal electrodes. The feeder circuit may include an auxiliary matching circuit whose one end electrically connects to a predetermined position of the feeder circuit and whose other end is electrically open. The auxiliary matching circuit enables a matching state to be finely adjusted. Also, the at least two mount electrodes may be balanced input/output terminal electrodes.

A portion of the at least two inductance elements may be exposed on a side surface of the feeder circuit substrate and the exposed portion may function also as a radiating plate. The portion of the inductance elements electromagnetically couples to the radiating plate on the side surface of the feeder circuit substrate, so that the radiation characteristic is enhanced.

The feeder circuit substrate may be a multilayer substrate made of, for example, ceramic or resin, or may be a flexible substrate. Particularly, by providing the inductance elements constituting the feeder circuit in the substrate, the feeder circuit is not susceptible to being affected by the outside of the substrate, so that variations in radiation characteristic can be prevented.

According to a preferred embodiment of the present invention, a feeder circuit substrate including a resonance circuit and/or a matching circuit is provided between a radio frequency IC chip and a radiating plate. With this configuration, the resonance frequency and the radiation characteristic of a radio frequency IC device are effectively not susceptible to being affected by an article to which the radio frequency IC device is attached. Furthermore, since at least two inductance elements provided in the feeder circuit substrate are spirally wound in opposite directions, magnetic fields generated thereby are canceled out and a wideband characteristic can be obtained near the resonance frequency.

These and other features, elements, arrangements, steps, characteristics and advantages of the present invention will become more apparent from the following detailed description of preferred embodiments of the present invention with reference to the attached drawings.

BRIEF DESCRIPTION OF THE DRAWINGS

FIGS. 2A and 2B illustrate a radiating substrate constituting the radio frequency IC device according to the first preferred embodiment, wherein FIG. 2A is a plan view and FIG. 2B is a plan view illustrating a state in which a feeder circuit substrate is bonded.

FIGS. 7A-7C illustrate a radiating substrate of the radio frequency IC device according to the third preferred embodiment, wherein FIG. 7A is a plan view, FIG. 7B is a back view, and FIG. 7C is a plan view of a magnetic substance provided on the rear surface.

FIGS. 23A and 23B are plan views showing a layout of a radio frequency IC device according to the tenth preferred embodiment of the present invention.

FIG. 24 is an equivalent circuit diagram of the feeder circuit substrate according to an eleventh preferred embodiment of the present invention.

FIGS. 29A-29D are cut-away and plan views of a configuration of the twelfth to fifteenth preferred embodiments of the present invention.

FIGS. 31A-31D are plan views showing a radiating substrate according to the twelfth to fifteenth preferred embodiments of the present invention.

DETAILED DESCRIPTION OF PREFERRED EMBODIMENTS

Hereinafter, preferred embodiments of the radio frequency IC device according to the present invention are described with reference to the attached drawings.

First Preferred Embodiment (FIGS. 1 to 4)

Figure 2A:
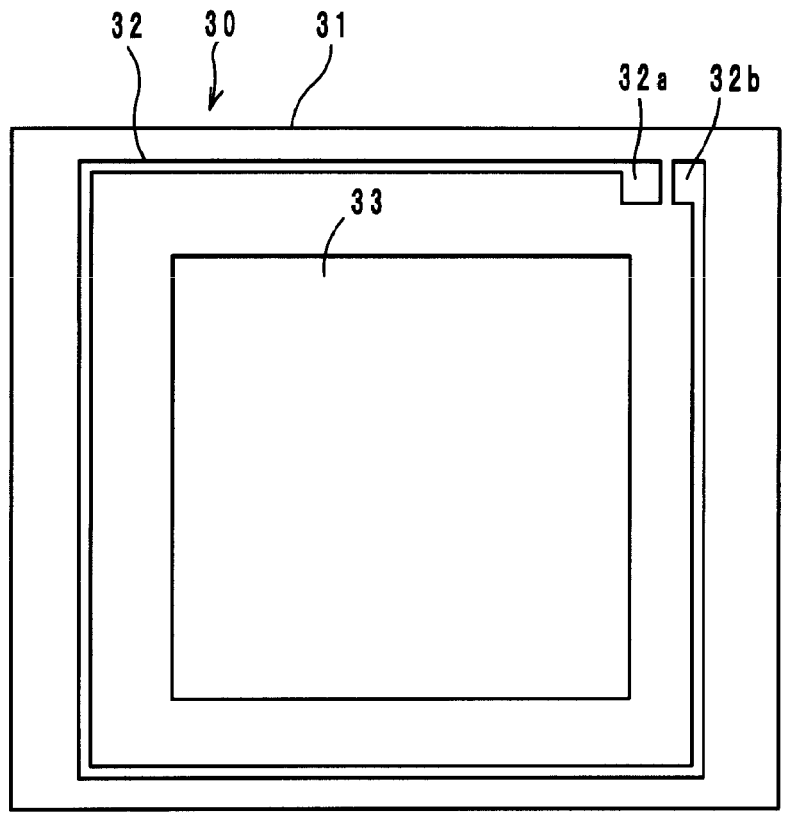
Figure 2B:
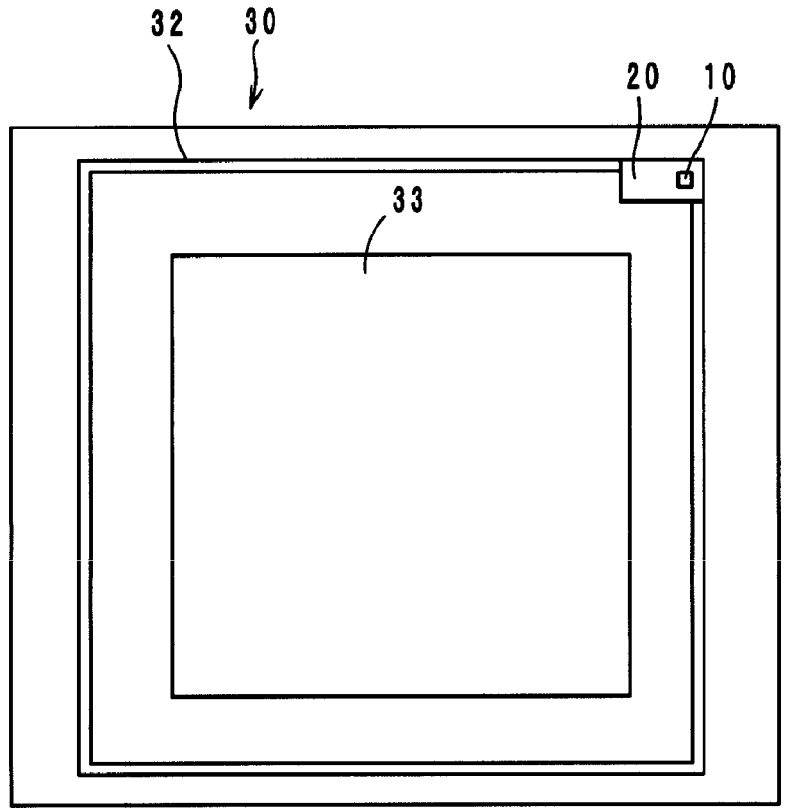
Figure 3:
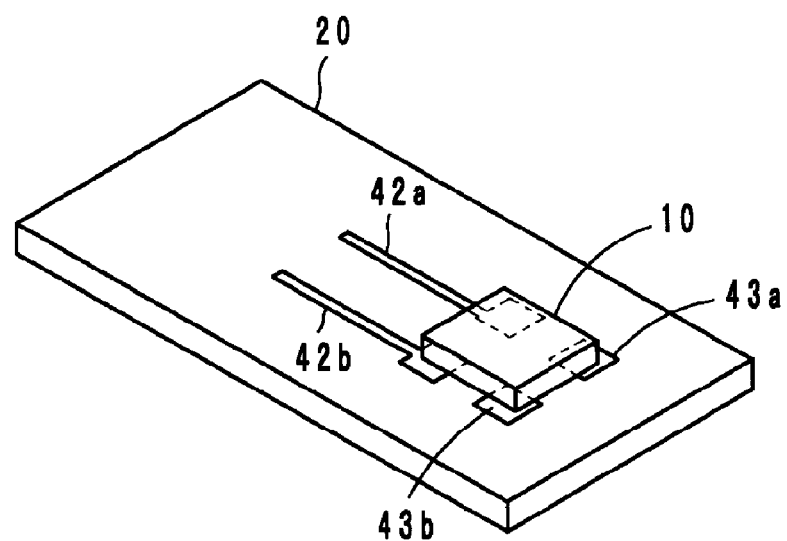
FIG. 3 is a perspective view illustrating a state where a radio frequency IC chip is mounted on the feeder circuit substrate constituting the radio frequency IC device according to the first preferred embodiment of the present invention.

A radio frequency IC device according to a first preferred embodiment includes a radio frequency IC chip 10 arranged to process transmission/reception signals of predetermined frequencies and a feeder circuit substrate 20 on which the radio frequency IC chip 10 is mounted illustrated in FIG. 3, and also includes a radiating substrate 30 illustrated in FIG. 2A or FIG. 2B.

Figure 1:
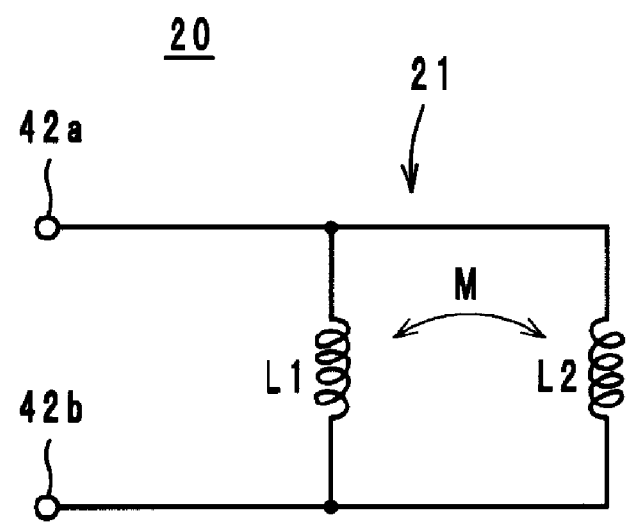
FIG. 1 is an equivalent circuit diagram illustrating a feeder circuit of a radio frequency IC device according to a first preferred embodiment of the present invention.

As illustrated in an equivalent circuit diagram in FIG. 1, the feeder circuit substrate 20 includes a feeder circuit 21 (the details are described below with reference to FIG. 4) having a resonance circuit and a matching circuit including inductance elements L1 and L2, which have inductance values that are different from each other and which magnetically couple to each other in opposite phases (indicated by mutual inductance M).

The radio frequency IC chip 10 includes, for example, a clock circuit, a logic circuit, a memory circuit, and so on, stores necessary information, and is provided with a pair of input/output terminal electrodes and a pair of mounting terminal electrodes on its rear surface (not illustrated). As illustrated in FIG. 3, the input/output terminal electrodes electrically connect to feeder terminal electrodes 42a and 42b arranged on the feeder circuit substrate 20, and the mounting terminal electrodes electrically connect to mount electrodes 43a and 43b, through metal bumps or the like.

As illustrated in FIGS. 2A and 2B, in the radiating substrate 30, a loop-shaped radiating plate 32 preferably made of a non-magnetic metallic material is placed on a flexible resin film substrate 31 along the edge thereof. The feeder circuit substrate 20 is bonded to end portions 32a and 32b by an adhesive. Each of the end portions 32a and 32b couples to any of the inductance elements L1 and L2 of the feeder circuit 21. Also, a magnetic substance 33 is placed inside the loop of the radiating plate 32. FIG. 2B illustrates a state where the feeder circuit substrate 20 on which the radio frequency IC chip 10 is mounted is bonded to the radiating plate 32 of the radiating substrate 30.

The inductance elements L1 and L2 included in the feeder circuit 21 magnetically couple to each other in opposite phases, resonate with frequencies processed by the radio frequency IC chip 10, and also electromagnetically couple to the end portions 32a and 32b of the radiating plate 32. The feeder circuit 21 realizes matching between the impedance of the radio frequency IC chip 10 (normally about 50 Ω) and the impedance of the radiating plate 32 (spatial impedance of about 377 Ω).

Therefore, the feeder circuit 21 transmits a transmission signal that has a predetermined frequency and that is output from the radio frequency IC chip 10 to the radiating plate 32, selects a signal component having a predetermined frequency from a signal received from the radiating plate 32, and supplies the selected signal component to the radio frequency IC chip 10. Accordingly, in this radio frequency IC device, the radio frequency IC chip 10 operates in accordance with a signal received by the radiating plate 32 and a response signal from the radio frequency IC chip 10 is externally radiated from the radiating plate 32.

As described above, in this radio frequency IC device, the resonance frequency of signals is set in the feeder circuit 21 provided in the feeder circuit substrate 20. Thus, the radio frequency IC device normally operates when being attached to various articles, variations in radiation characteristic can be prevented, and there is no need to design the radiating plate 32 and so on for individual articles. The frequency of a transmission signal radiated from the radiating plate 32 and the frequency of a reception signal supplied to the radio frequency IC chip 10 substantially correspond to the resonance frequency of the feeder circuit 21 in the feeder circuit substrate 20. A maximum gain of the signals is substantially determined by at least one of the size and shape of the feeder circuit 21 and the distance and medium between the feeder circuit and the radiating plate. Since the frequencies of transmission/reception signals are determined in the feeder circuit substrate 20, a stable frequency characteristic can be obtained while preventing a change in the frequency characteristic in any shape or size of the radiating plate 32 and a positional relationship, for example, even if the radio frequency IC device is rolled or is sandwiched by dielectrics.

Figure 4:
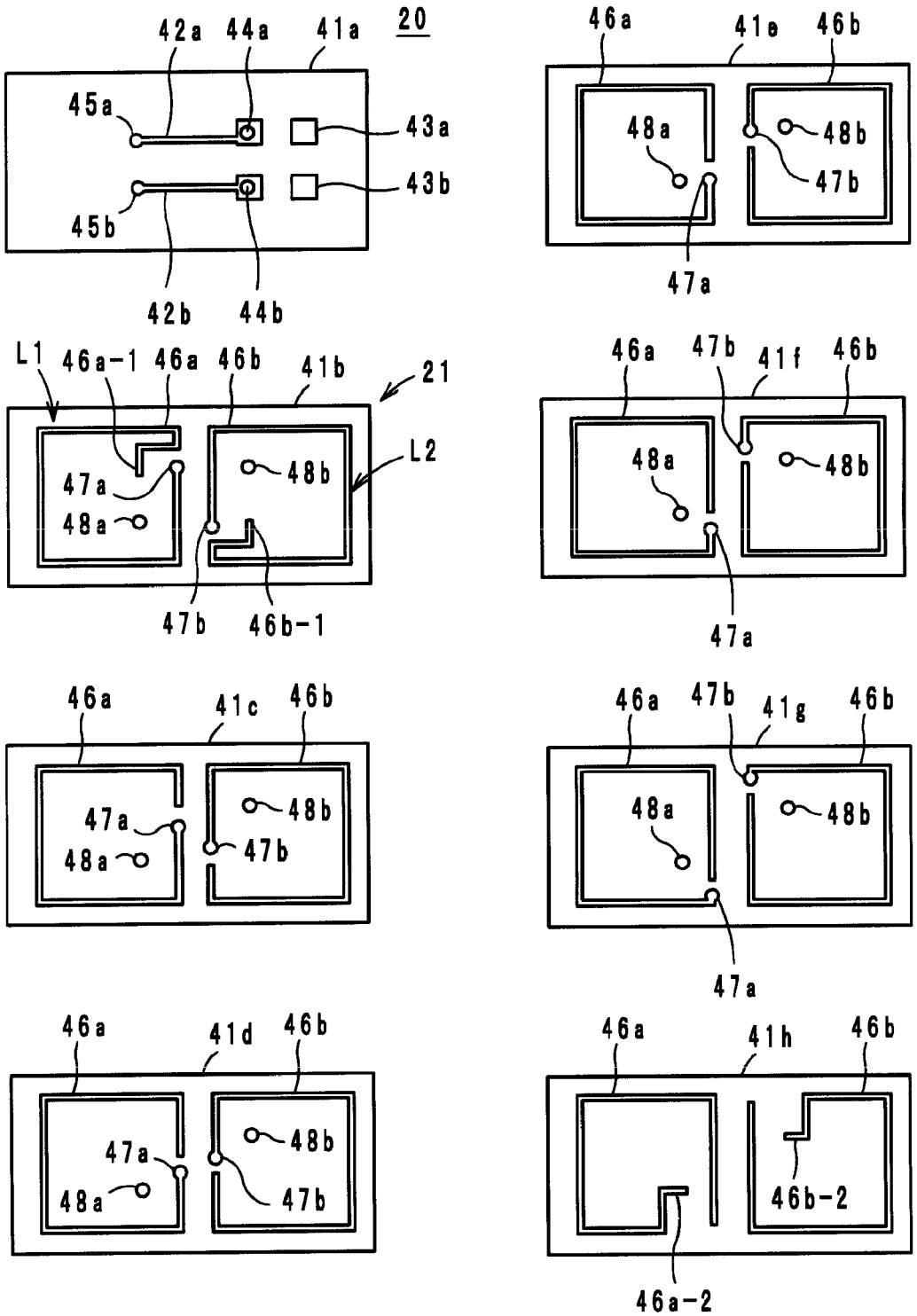
FIG. 4 is a plan view illustrating a lamination structure of the feeder circuit substrate of the radio frequency IC device according to the first preferred embodiment of the present invention.

Now, a configuration of the feeder circuit substrate 20 is described with reference to FIG. 4. The feeder circuit substrate 20 is formed by, for example, laminating, crimping, and firing ceramic sheets 41a to 41h made of a dielectric or magnetic material. The sheet 41a in the top layer is provided with the feeder terminal electrodes 42a and 42b, the mount electrodes 43a and 43b, and via-hole conductors 44a, 44b, 45a, and 45b. Each of the sheets 41b to 41h in the second to eighth layers is provided with wiring electrodes 46a and 46b defining the inductance elements L1 and L2, and is also provided with via-hole conductors 47a, 47b, 48a, and 48b as necessary.

By laminating the sheets 41a to 41h, the wiring electrodes 46a are spirally connected via the via-hole conductors 47a to form the inductance element L1, while the wiring electrodes 46b are spirally connected via the via-hole conductors 47b to form the inductance element L2. Also, a capacitance is formed between lines of the wiring electrodes 46a and 46b.

An end portion 46a-1 of the wiring electrode 46a on the sheet 41b connects to the feeder terminal electrode 42a via the via-hole conductor 45a, and an end portion 46a-2 of the wiring electrode 46a on the sheet 41h connects to the feeder terminal electrode 42b via the via-hole conductors 48a and 45b. An end portion 46b-1 of the wiring electrode 46a on the sheet 41b connects to the feeder terminal electrode 42b through the via-hole conductor 44b, and an end portion 46b-2 of the wiring electrode 46b on the sheet 41h connects to the feeder terminal electrode 42a via the via-hole conductors 48b and 44a.

In the above-described feeder circuit 21, the inductance elements L1 and L2 are wound in the directions opposite to each other, and thus magnetic fields generated by the inductance elements L1 and L2 are canceled out. Because the magnetic fields are canceled out, the wiring electrodes 46a and 46b need to be long to some extent in order to obtain a desired inductance value. This causes a Q value to be small with no steepness in resonance characteristic, and thus a wideband characteristic can be obtained near the resonance frequency.

The inductance elements L1 and L2 are placed in different positions on the right and left when the feeder circuit substrate 20 is viewed in a perspective plan view. The directions of the magnetic fields generated by the inductance elements L1 and L2 are opposite to each other. Accordingly, when the feeder circuit 21 is coupled to the end portions 32a and 32b of the loop-shaped radiating plate 32, currents are excited in opposite directions in the end portions 32a and 32b, so that signals can be transmitted/received by the loop-shaped radiating plate 32. Alternatively, the inductance elements L1 and L2 may be coupled to two different radiating plates, respectively.

The radiating plate 32 is defined by a loop-shaped electrode having the end portions 32a and 32b, which couple to the inductance elements L1 and L2, respectively. The magnetic substance 33 made of ferrite or the like is placed inside the loop-shaped electrode. The magnetic substance 33 causes the magnetic field generated by the radiating plate 32 including the loop-shaped electrode to be amplified, so that a communication distance increases. The magnetic substance 33 is not always necessary, and can be omitted.

By using a magnetic material in the feeder circuit substrate 20 and providing the inductance elements L1 and L2 in the magnetic substance, a large inductance value can be obtained to deal with a frequency of an approximately 13.56 MHz band, for example. Furthermore, even if processing, variations of a magnetic sheet or variations in permeability occur, variations in impedance with respect to that of the radio frequency IC chip 10 can be absorbed. The permeability μ of the magnetic substance is preferably about 400, for example.

By setting the inductance values of the two inductance elements L1 and L2 to the same or substantially the same values, the intensities of magnetic fields generated by the inductance elements L1 and L2 can be made equal to each other. Accordingly, the canceling amounts of the magnetic fields in the two inductance elements L1 and L2 can be made equal to each other, so that a wideband characteristic near the resonance frequency can be obtained.

The feeder circuit substrate 20 may be a multilayer substrate made of, for example, ceramic or resin, or may be a substrate including, for example, a laminate of flexible sheets made of a dielectric material, such as polyimide or liquid crystal polymer. Particularly, the configuration in which the inductance elements L1 and L2 are integrated in the feeder circuit substrate 20 enables the feeder circuit 21 to be not susceptible to being affected by the outside of the substrate, so that variations in radiation characteristic can be prevented.

The feeder circuit substrate 20 need not be bonded to the end portions 32a and 32b of the radiating plate 32, and may be placed near the end portions 32a and 32b.

Figure 5:
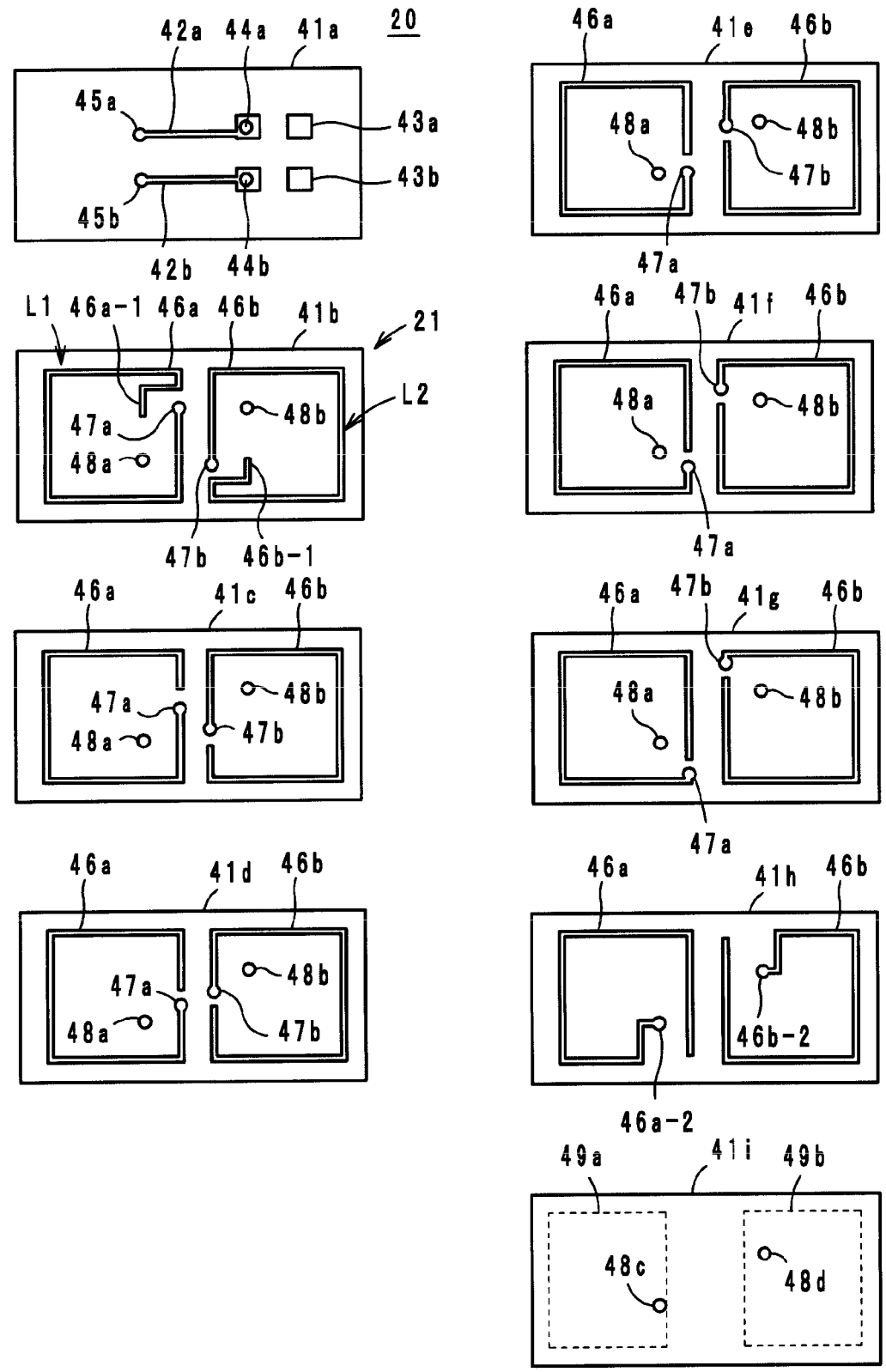
FIG. 5 is a plan view illustrating a lamination structure of a feeder circuit substrate of a radio frequency IC device according to a second preferred embodiment of the present invention.

Second Preferred Embodiment (FIG. 5)

A radio frequency IC device according to a second preferred embodiment preferably has basically the same configuration as that of the first preferred embodiment. As illustrated in FIG. 5, the difference between the first and second preferred embodiments is that flat electrodes 49a and 49b are provided on the rear surface of a sheet 41i in the bottom layer of the feeder circuit substrate 20. The size of the flat electrodes 49a and 49b preferably is the approximately the same as or smaller than that of the outer shape of the inductance elements L1 and L2, when the feeder circuit substrate 20 is viewed in a perspective plan view.

Via-hole conductors are placed at the end portions 46a-2 and 46b-2 of the wiring electrodes 46a and 46b forming the inductance elements L1 and L2. Those via-hole conductors connect to the feeder terminal electrodes 42a and 42b and also connect to the flat electrodes 49a and 49b via via-hole conductors 48c and 48d provided on the sheet 41i. By providing the flat electrodes 49a and 49b, variations in coupling between the feeder circuit 21 and the radiating plate 32 can be minimized.

The flat electrodes 49a and 49b need not be electrically connected to the wiring electrodes 46a and 46b, and may be electrically connected to the radiating plate 32.

Figure 6:
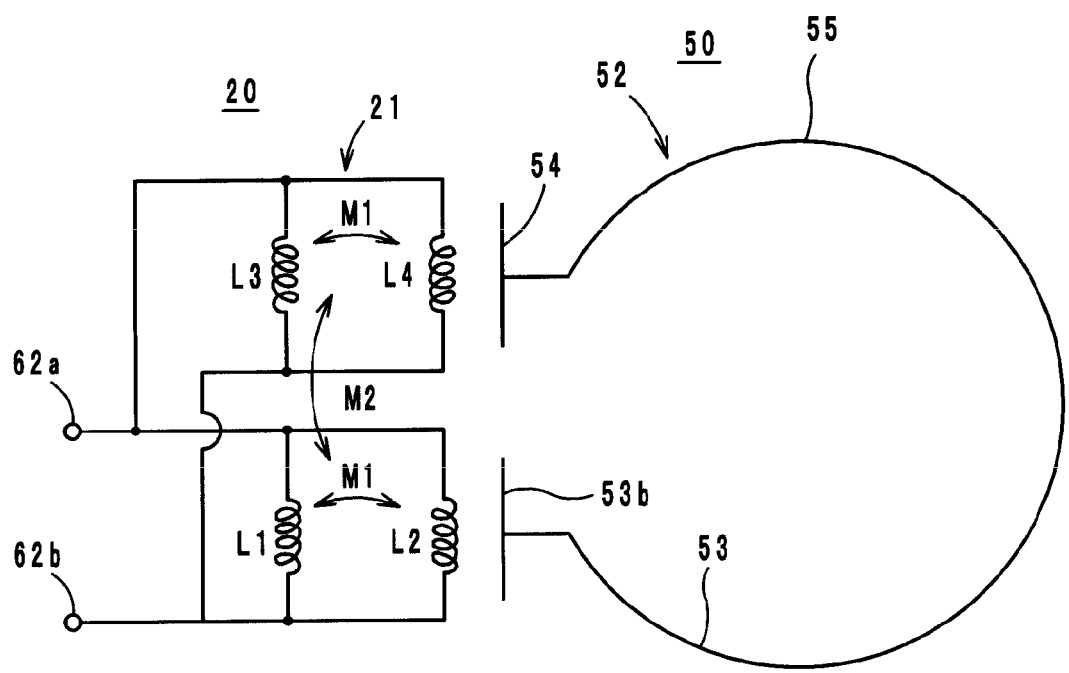
FIG. 6 is an equivalent circuit diagram of a radio frequency IC device according to a third preferred embodiment of the present invention.
Figure 7A:
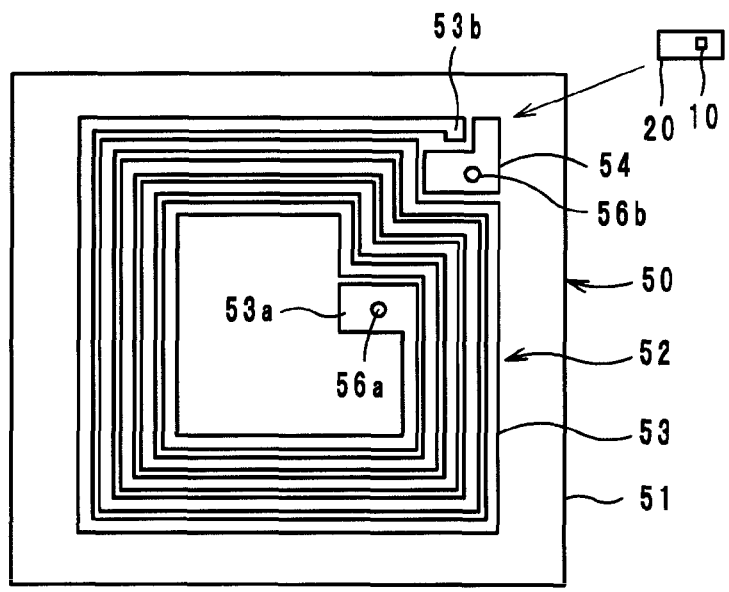
Figure 7B:
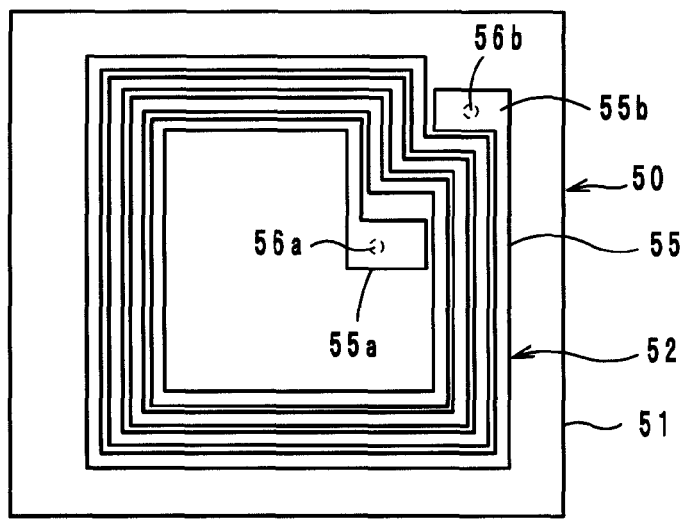
Figure 7C:
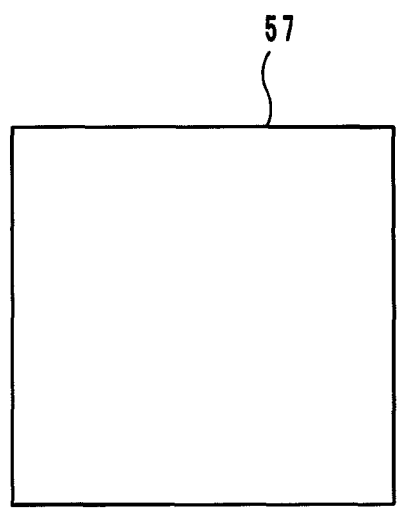
Figure 8:
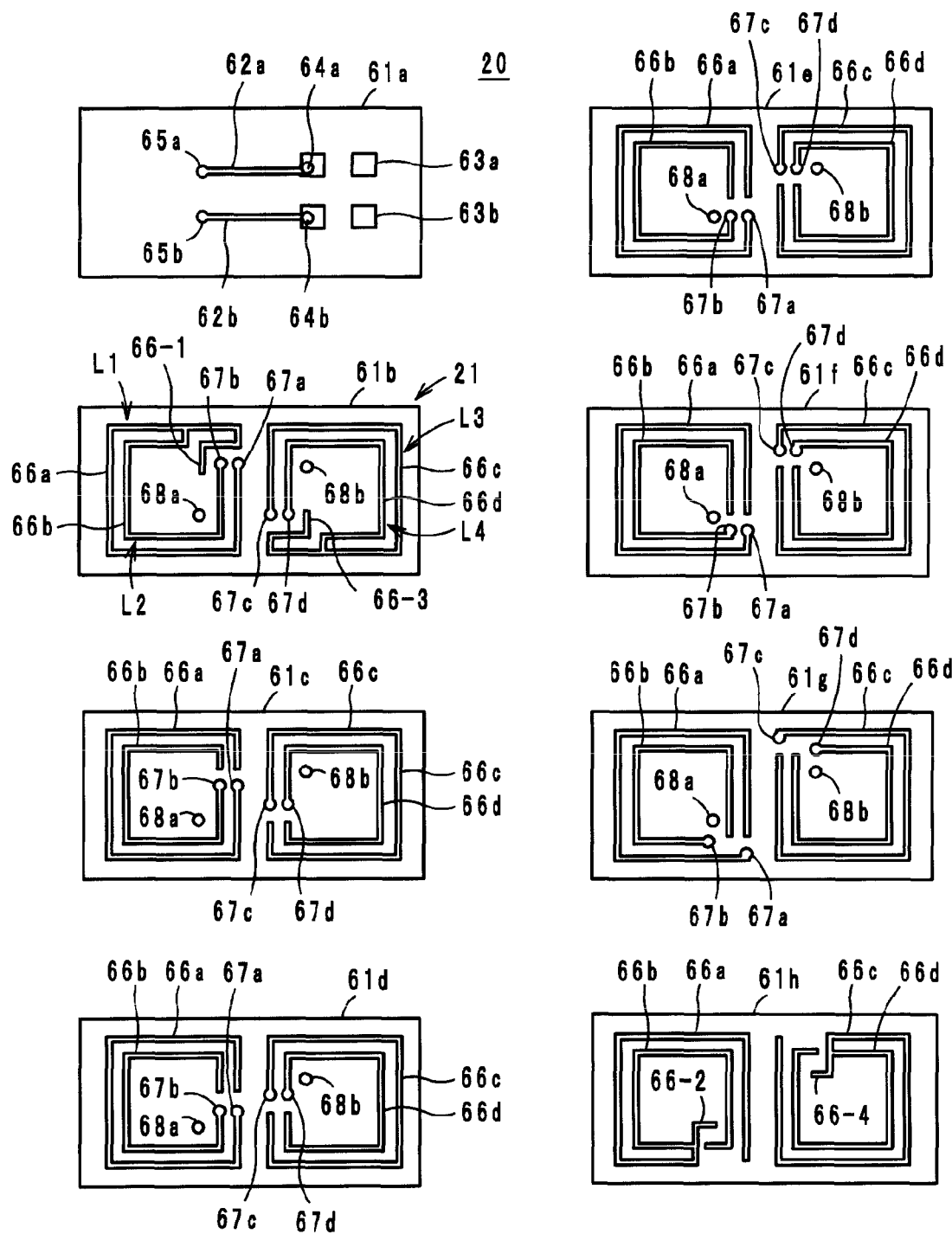
FIG. 8 is a plan view illustrating a lamination structure of a feeder circuit substrate of the radio frequency IC device according to the third preferred embodiment of the present invention.

Third Preferred Embodiment (FIGS. 6 to 8)

In a radio frequency IC device according to a third preferred embodiment, as illustrated in FIG. 7A, the feeder circuit substrate 20 on which the radio frequency IC chip 10 is mounted is bonded to an end portion 53b of an electrode 53 and an electrode 54 placed on a front surface of a radiating substrate 50 by an adhesive. The radio frequency IC chip 10 preferably has substantially the same configuration as that of the first preferred embodiment.

In the radiating substrate 50, the spiral electrode 53 and the electrode 54 defining a radiating plate 52 are placed on the front surface of a flexible resin film substrate 51, as illustrated in FIG. 7A, and a spiral electrode 55 defining the radiating plate 52 is placed on the rear surface thereof, as illustrated in FIG. 7B.

An end portion 53a of the electrode 53 electrically connects to an end portion 55a of the electrode 55 via a via-hole conductor 56a, and an end portion 55b of the electrode 55 electrically connects to the electrode 54 via a via-hole conductor 56b. On the rear surface of the substrate 50, a magnetic substance 57 made of ferrite or the like is placed on the electrode 55 inside the outer edge of the electrode 55. The magnetic substance 57 may be made of a magnetic metal material. In that case, the magnetic substance 57 needs to be electrically insulated from the electrode 55.

In the feeder circuit substrate 20, as illustrated in an equivalent circuit diagram in FIG. 6, the inductance elements L1 and L2 and inductance elements L3 and L4 having inductance values different from each other magnetically couple to each other in the same phase, respectively (mutual inductance M1), and the inductance elements L1 and L2 magnetically couple to the inductance elements L3 and L4 in opposite phases (mutual inductance M2). The feeder circuit 21 including a resonance circuit and a matching circuit including the inductance elements L1, L2, L3, and L4 is described below with reference to FIG. 8.

The inductance elements L1 and L2 and inductance elements L3 and L4 included in the feeder circuit 21 magnetically couple to each other in opposite phases to resonate with frequencies processed by the radio frequency IC chip 10, and also electromagnetically couple to the end portion 53b and the electrode 54 of the loop-shaped radiating plate 52. Feeder terminal electrodes 62a and 62b of the feeder circuit 21 electrically connect to input/output terminal electrodes (not illustrated) of the radio frequency IC chip 10 so as to realize matching between the impedance of the radio frequency IC chip 10 (normally about 50 Ω) and the impedance of the radiating plate 52 (spatial impedance of about 377 Ω).

In the third preferred embodiment, if a signal of a positive polarity is applied to the electrode 54 of the loop-shaped radiating plate 52, a signal of a negative polarity is applied to the end portion 53b. Accordingly, a current flows from a positive (electrode 54) to a negative (end portion 53b) direction, so that a signal is transmitted between the radiating plate 52 and the feeder circuit 21.

Therefore, as in the first preferred embodiment, the feeder circuit 21 transmits a transmission signal that is output from the radio frequency IC chip 10 and that has a predetermined frequency to the radiating plate 52, and also selects a reception signal having a predetermined frequency from a signal received by the radiating plate 52 and supplies the selected signal to the radio frequency IC chip 10. Accordingly, in this radio frequency IC device, the radio frequency IC chip 10 is operated by a signal received by the radiating plate 52 and a response signal from the radio frequency IC chip 10 is externally radiated from the radiating plate 52. As described above, the operation and effect of the third preferred embodiment are basically the same as those of the first preferred embodiment.

Now, a configuration of the feeder circuit substrate 20 is described with reference to FIG. 8. The feeder circuit substrate 20 is formed by, for example, laminating, crimping, and firing ceramic sheets 61a to 61h preferably made of a dielectric or magnetic material. The sheet 61a in the top layer is provided with the feeder terminal electrodes 62a and 62b, mount electrodes 63a and 63b, and via-hole conductors 64a, 64b, 65a, and 65b. Each of the sheets 61b to 61h in the second to eighth layers is provided with wiring electrodes 66a, 66b, 66c, and 66d defining the inductance elements L1, L2, L3, and L4 and is also provided with via-hole conductors 67a, 67b, 67c, 67d, 68a, and 68b as necessary.

By laminating the sheets 61a to 61h, the wiring electrodes 66a are spirally connected via the via-hole conductors 67a to form the inductance element L1, while the wiring electrodes 66b are spirally connected via the via-hole conductors 67b to form the inductance element L2. Also, the wiring electrodes 66c are spirally connected via the via-hole conductors 67c to form the inductance element L3, while the wiring electrodes 66d are spirally connected via the via-hole conductors 67d to form the inductance element L4. Also, a capacitance is formed between lines of the wiring electrodes 66a, 66b, 66c, and 66d.

An end portion 66-1 where the wiring electrodes 66a and 66b on the sheet 61b are integrated connects to the feeder terminal electrode 62a via the via-hole conductor 65a, and an end portion 66-2 where the wiring electrodes 66a and 66b on the sheet 41h are integrated connects to the feeder terminal electrode 62b via the via-hole conductors 68a and 65b. An end portion 66-3 where the wiring electrodes 66c and 66d on the sheet 61b are integrated connects to the feeder terminal electrode 62b via the via-hole conductor 64b, and an end portion 66-4 where the wiring electrodes 66c and 66d on the sheet 61h are integrated connects to the feeder terminal electrode 62a via the via-hole conductors 68b and 64a.

The operation of the feeder circuit 21 having the above-described configuration is basically the same as that of the feeder circuit 21 described above in the first preferred embodiment. Particularly, the inductance elements L1 and L2 and the inductance elements L3 and L4 are defined by the two wiring electrodes 66a and 66b and the two wiring electrodes 66c and 66d that are adjacent to each other on the same plane. With this configuration, a wideband resonance characteristic can be obtained by changing the length of the wiring electrodes or the gap between the electrodes.

The radiating plate 52 is constituted by the loop-shaped electrode including the end electrode 53a on one side and the end electrode 54 on the other side, and the end electrodes 53a and 54 couple to the different inductance elements L1 and L2 and L3 and L4, respectively. Furthermore, since the magnetic substance 57 is placed inside the outer edge of the loop-shaped electrode, the magnetic field generated by the radiating plate 52 including the loop-shaped electrode is amplified and the communication distance increases. The magnetic substance 57 is not always necessary and can be omitted.

Figure 9:
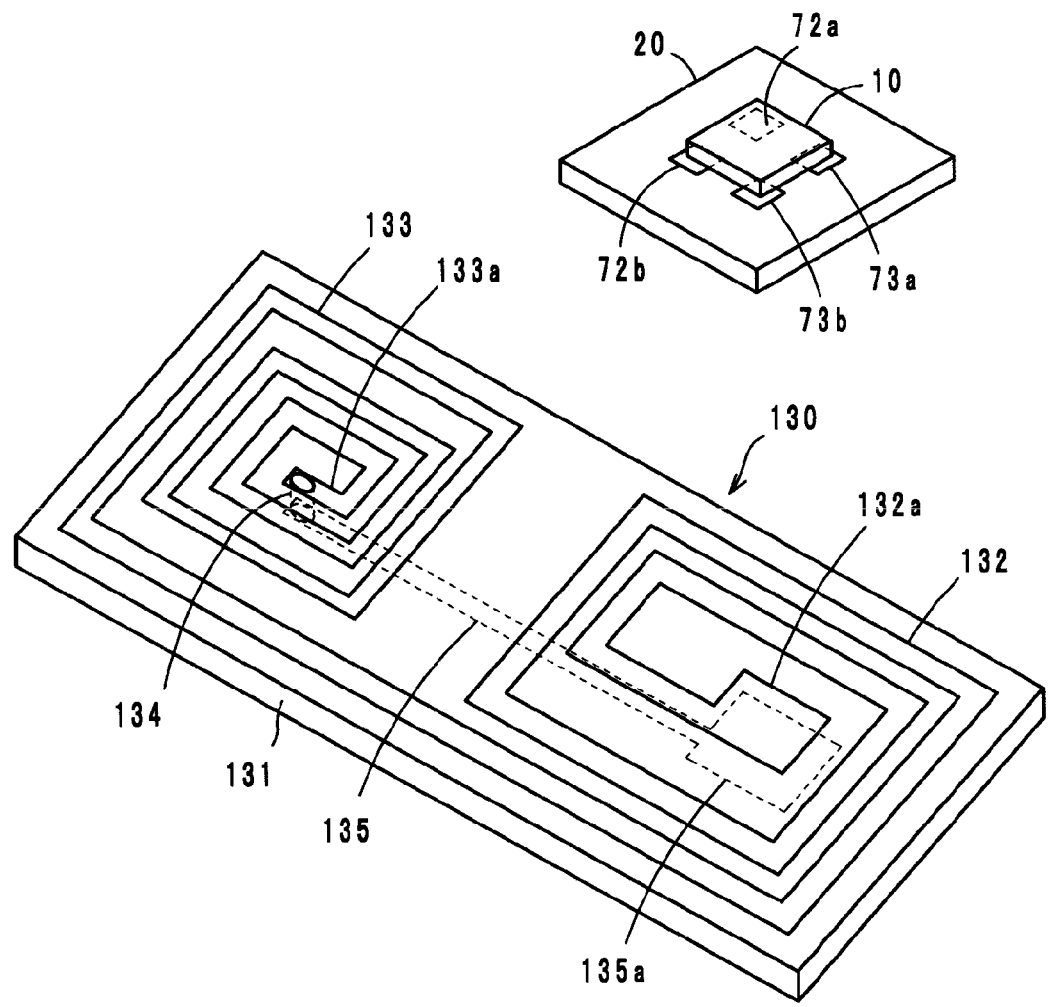
FIG. 9 is a perspective view illustrating a radio frequency IC device according to a fourth preferred embodiment of the present invention.
Figure 10:
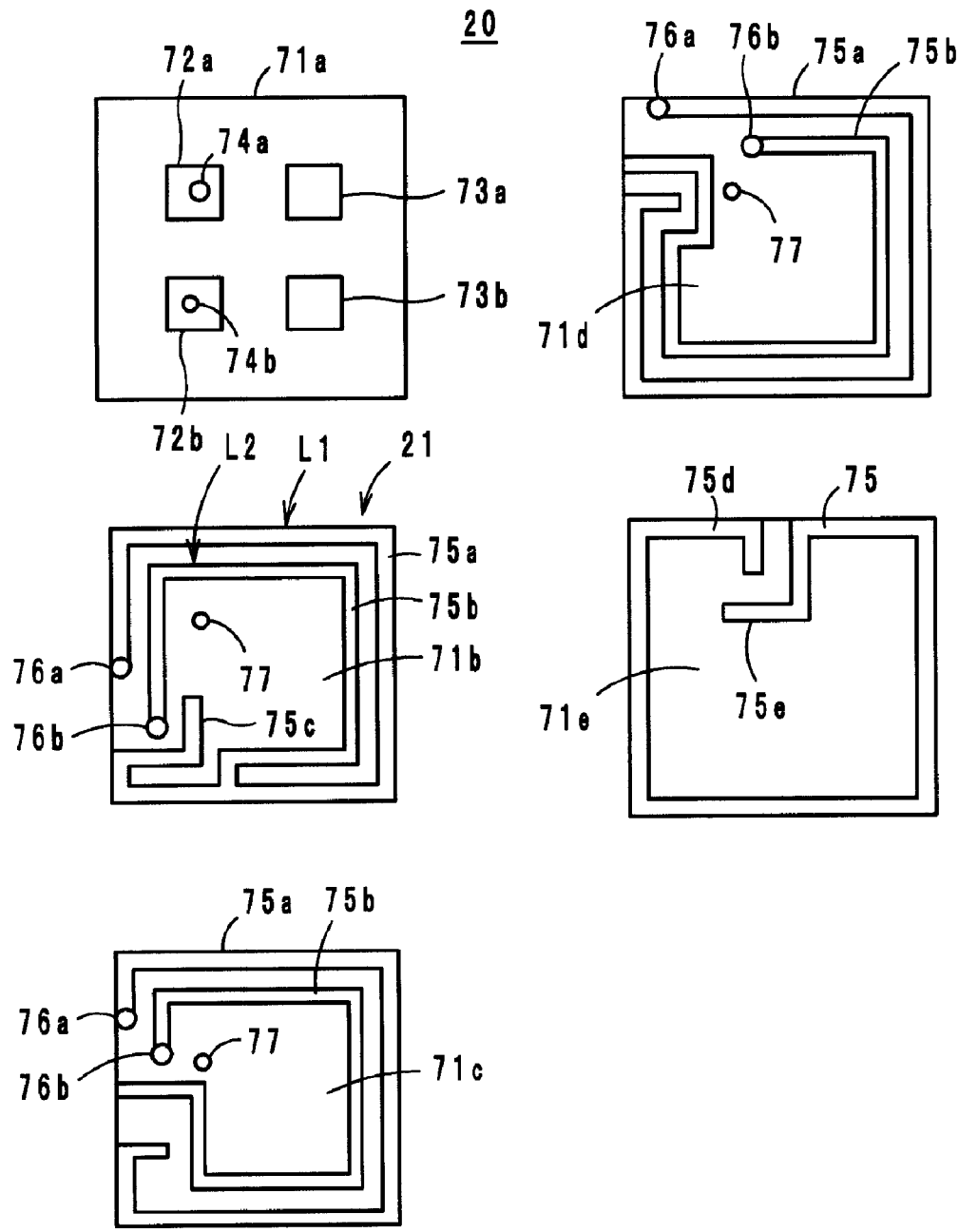
FIG. 10 is a plan view illustrating a lamination structure of a feeder circuit substrate of the radio frequency IC device according to the fourth preferred embodiment of the present invention.

Fourth Preferred Embodiment (FIGS. 9 and 10)

As illustrated in FIG. 9, a radio frequency IC device according to a fourth preferred embodiment includes the radio frequency IC chip 10, the feeder circuit substrate 20, and a radiating substrate 130 including a radiating plate 132.

The radio frequency IC chip 10 preferably has the same configuration as that of the first preferred embodiment. The feeder circuit substrate 20 includes two inductance elements L1 and L2. Feeder terminal electrodes 72a and 72b and mount electrodes 73a and 73b placed on a front surface of the feeder circuit substrate 20 electrically connect to input/output terminal electrodes and mounting terminal electrodes (not illustrated) of the radio frequency IC chip 10.

In the radiating substrate 130, the spiral radiating plate 132 is placed in a half portion of the front surface of a ceramic substrate 131 and a spiral auxiliary electrode 133 is placed in the other half portion. The feeder circuit substrate 20 on which the radio frequency IC chip 10 is mounted is bonded to the radiating plate 132 preferably by an adhesive, for example. Also, in the auxiliary electrode 133, an end portion 133a positioned at the center connects to an electrode 135 placed on the rear surface of the substrate 131 via a via-hole conductor 134, and an end portion 135a of the electrode 135 capacitively couples to an end portion 132a positioned at the center of the radiating plate 132. Alternatively, the electrode 135 may be placed inside the substrate 131.

As illustrated in FIG. 10, the feeder circuit substrate 20 is formed by, for example, laminating, crimping, and firing ceramic sheets 71a to 71e made of, for example, a dielectric or magnetic material. The sheet 71a in the top layer is provided with the feeder terminal electrodes 72a and 72b, the mount electrodes 73a and 73b, and via-hole conductors 74a and 74b. Each of the sheets 71b to 71d in the second to fourth layers is provided with wiring electrodes 75a and 75b defining the inductance elements L1 and L2 and via-hole conductors 76a, 76b, and 77. The sheet 71e in the bottom layer is provided with a wiring electrode 75. The wiring electrodes 75a and 75 are exposed at the periphery of the respective sheets 71b to 71e.

By laminating the sheets 71a to 71e, the wiring electrodes 75a are spirally connected via the via-hole conductors 76a to form the inductance element L1, while the wiring electrodes 75b are spirally connected via the via-hole conductors 76b to form the inductance element L2. The wiring electrodes 75a and 75b branch on the sheet 71b and are integrated in the wiring electrode 75 on the sheet 71e in the bottom layer. Also, a capacitance is formed between lines of the wiring electrodes 75a and 75b.

An end portion 75c where the wiring electrodes 75a and 75b on the sheet 71b are integrated connects to the feeder terminal electrode 72b via the via-hole conductor 74b, an end portion 75d of the wiring electrode 75 on the sheet 71e connects to the wiring electrodes 75a and 75b via the via-hole conductors 76a and 76b on the next upper sheet 71d. Also, an end portion 75e of the wiring electrode 75 connects to the feeder terminal electrode 72a via the via-hole conductors 77 and 74a.

The feeder circuit 21 having the above-described configuration including the inductance elements L1 and L2 has the same equivalent circuit as that of the feeder circuit 21 illustrated in FIG. 1. The inductance elements L1 and L2 magnetically couple to each other in opposite phases and resonate with frequencies processed by the radio frequency IC chip 10, and also electromagnetically couple to the radiating plate 132. Also, the feeder circuit 21 realizes matching between the impedance of the radio frequency IC chip 10 (normally about 50 Ω) and the impedance of the radiating plate 132 (spatial impedance of about 377 Ω).

Thus, the operation and effect of the fourth preferred embodiment are the same as those of the first preferred embodiment. Particularly, in the fourth preferred embodiment, a portion of the inductance elements L1 and L2 (the wiring electrodes 75a and 75) is exposed on a side surface of the feeder circuit substrate 20, and this exposed portion also functions as a radiating plate. Furthermore, the exposed portion of the inductance elements L1 and L2 electromagnetically couples to the radiating plate 132 and the auxiliary electrode 133 on the side surface of the feeder circuit substrate 20, so that the radiating characteristic is enhanced. The outer dimension of the auxiliary electrode 133 is the same as or larger than the outer dimension of the feeder circuit substrate 20, and thus the auxiliary electrode 133 can easily couple to the magnetic field radiated from the rear and side surfaces of the feeder circuit substrate 20.

Figure 11:
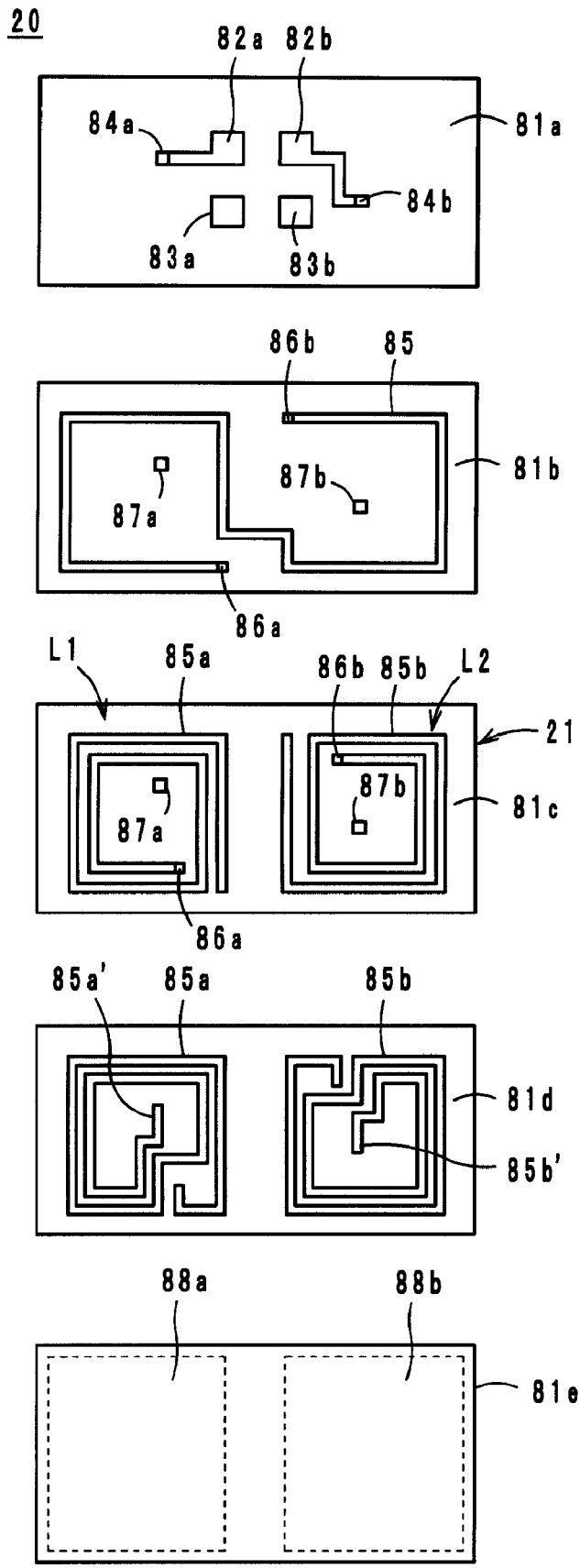
FIG. 11 is a plan view illustrating a lamination structure of a feeder circuit substrate of a radio frequency IC device according to a fifth preferred embodiment of the present invention.

Fifth Preferred Embodiment (FIG. 11)

A radio frequency IC device according to a fifth preferred embodiment includes the feeder circuit substrate 20 illustrated in FIG. 11. The other components, that is, the radio frequency IC chip 10 and the radiating substrate 30, are preferably the same as those of the first preferred embodiment.

The feeder circuit substrate 20 is formed by, for example, laminating, crimping, and firing ceramic sheets 81a to 81e made of, for example, a dielectric or magnetic material. The sheet 81a in the top layer is provided with feeder terminal electrodes 82a and 82b, mount electrodes 83a and 83b, and via-hole conductors 84a and 84b. The sheet 81b in the second layer is provided with a wiring electrode 85 and via-hole conductors 86a, 86b, 87a, and 87b. The sheet 81c in the third layer is provided with wiring electrodes 85a and 85b defining the inductance elements L1 and L2 and via-hole conductors 86a, 86b, 87a, and 87b. The sheet 81d in the fourth layer is provided with wiring electrodes 85a and 85b constituting the inductance elements L1 and L2. The rear surface of the sheet 81e in the bottom layer is provided with flat electrodes 88a and 88b.

By laminating the sheets 81a to 81e, the wiring electrodes 85a are spirally connected via the via-hole conductors 86a to form the inductance element L1, while the wiring electrodes 85b are spirally connected via the via-hole conductors 86b to form the inductance element L2. Also, a capacitance is provided between lines of the wiring electrodes 85a and 85b.

The wiring electrodes 85a and 85b are integrated in the wiring electrode 85 on the sheet 81b, an end portion 85a' of the wiring electrode 85a on the sheet 81d connects to the feeder terminal electrode 82a via the via-hole conductors 87a and 84a, and an end portion 85b' of the wiring electrode 85b connects to the feeder terminal electrode 82b via the via-hole conductors 87b and 84b.

The feeder circuit 21 having the above-described configuration including the inductance elements L1 and L2 has the same equivalent circuit as that of the feeder circuit 21 illustrated in FIG. 1. The inductance elements L1 and L2 magnetically couple to each other in opposite phases and resonate with frequencies processed by the radio frequency IC chip 10, and also electromagnetically couple to the radiating plate 32. Also, the feeder circuit 21 realizes matching between the impedance of the radio frequency IC chip 10 (normally about 50 Ω) and the impedance of the radiating plate 32 (spatial impedance of about 377 Ω).

Thus, the operation and effect of the fifth preferred embodiment are the same as those of the first preferred embodiment. Particularly, by providing the flat electrodes 88a and 88b on the rear surface of the feeder circuit substrate 20, variations in coupling between the feeder circuit 21 and the radiating plate 32 can be minimized. However, the flat electrodes 88a and 88b are not always necessary, and can be omitted if so desired.

Figure 12:
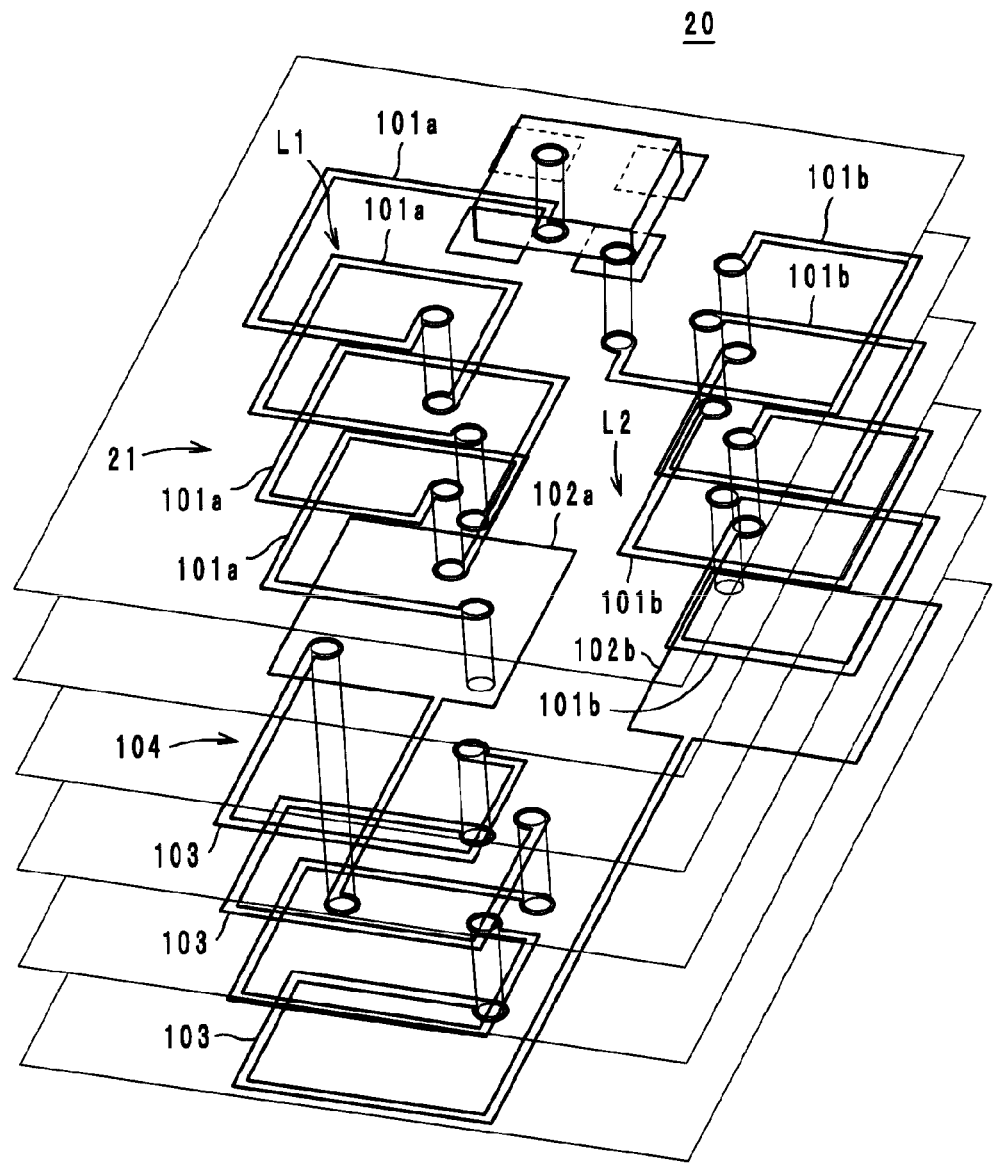
FIG. 12 is a perspective view illustrating a lamination structure of a feeder circuit substrate of a radio frequency IC device according to a sixth preferred embodiment of the present invention.

Sixth Preferred Embodiment (FIG. 12)

A radio frequency IC device according to a sixth preferred embodiment includes the feeder circuit substrate 20 illustrated in FIG. 12. The other components, that is, the radio frequency IC chip 10 and the radiating substrate 30, are preferably the same as those of the first preferred embodiment.

The configuration of the feeder circuit substrate 20 preferably is basically the same as that of the feeder circuit substrate 20 according to the first preferred embodiment. That is, spirally connected wiring electrodes 101a and 101b define the inductance elements L1 and L2. The inductance elements L1 and L2 have inductance values different from each other and magnetically couple to each other in opposite phases.

Furthermore, flat electrodes 102a and 102b are disposed immediately below the inductance elements L1 and L2, and spirally connected wiring electrodes 103 define a magnetic field receiving coil 104. The magnetic field receiving coil 104 connects to the flat electrodes 102a and 102b in series and has an auxiliary radiating function to couple the feeder circuit 21 and the radiating plate 32 (see FIG. 2).

The feeder circuit 21 including the inductance elements L1 and L2 according to the sixth preferred embodiment has the same equivalent circuit as that of the feeder circuit 21 illustrated in FIG. 1. The inductance elements L1 and L2 magnetically couple to each other in opposite phases and resonate with frequencies processed by the radio frequency IC chip 10, and also electromagnetically couple to the radiating plate 32. Also, the feeder circuit 21 realizes matching between the impedance of the radio frequency IC chip 10 (normally about 50 Ω) and the impedance of the radiating plate 32 (spatial impedance of about 377 Ω). Thus, the operation and effect of the sixth preferred embodiment are the same as those of the first preferred embodiment.

Figure 13:
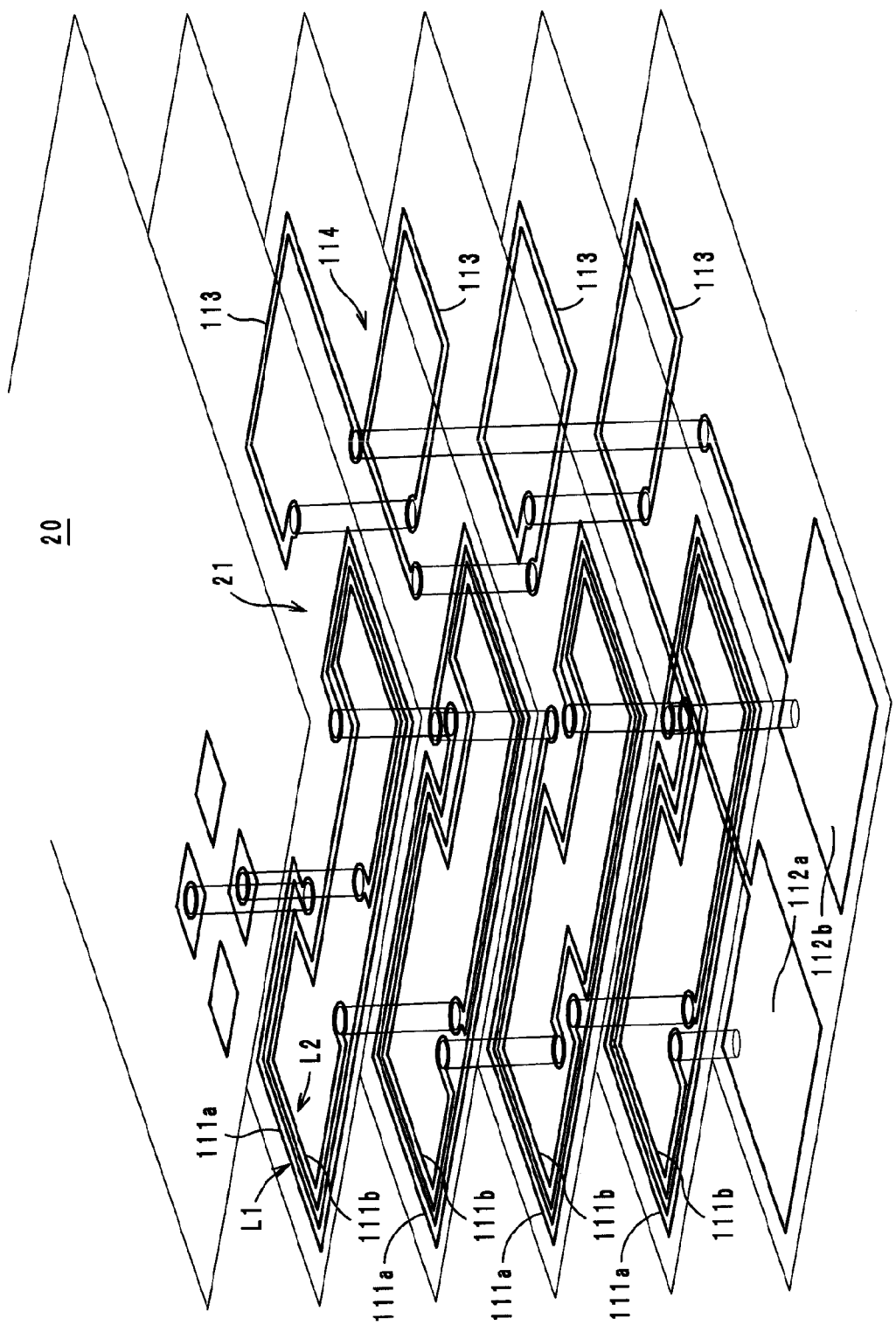
FIG. 13 is a perspective view illustrating a lamination structure of a feeder circuit substrate of a radio frequency IC device according to a seventh preferred embodiment of the present invention.

Seventh Preferred Embodiment (FIG. 13)

A radio frequency IC device according to a seventh preferred embodiment includes the feeder circuit substrate 20 illustrated in FIG. 13. The other components, that is, the radio frequency IC chip 10 and the radiating substrate 30, are preferably the same as those of the first preferred embodiment.

In the feeder circuit substrate 20, wiring electrodes 111a and 111b, which are adjacent to each other and are spirally connected, define the inductance elements L1 and L2. The inductance elements L1 and L2 have inductance values different from each other and magnetically couple to each other in opposite phases.

Furthermore, flat electrodes 112a and 112b are placed immediately below the inductance elements L1 and L2, and spirally connected wiring electrodes 113 define a magnetic field receiving coil 114. The magnetic field receiving coil 114 connects to the flat electrodes 112a and 112b in series and has an auxiliary radiating function to couple the feeder circuit 21 and the radiating plate 32 (see FIG. 2).

The feeder circuit 21 including the inductance elements L1 and L2 according to the seventh preferred embodiment has the same equivalent circuit as that of the feeder circuit 21 illustrated in FIG. 1. The inductance elements L1 and L2 magnetically couple to each other in opposite phases and resonate with frequencies processed by the radio frequency IC chip 10, and also electromagnetically couple to the radiating plate 32. Also, the feeder circuit 21 realizes matching between the impedance of the radio frequency IC chip 10 (normally about 50 Ω) and the impedance of the radiating plate 32 (spatial impedance of about 377 Ω). Thus, the operation and effect of the seventh preferred embodiment are the same as those of the first preferred embodiment.

Particularly, in the seventh preferred embodiment, the two wiring electrodes 111a and 111b adjacent to each other on the same plane form the inductance elements L1 and L2. By changing the length of the wiring electrodes 111a and 111b or the gap therebetween, a wideband resonance characteristic can be obtained.

Eighth Preferred Embodiment (See FIGS. 14 to 17)

Figure 14:
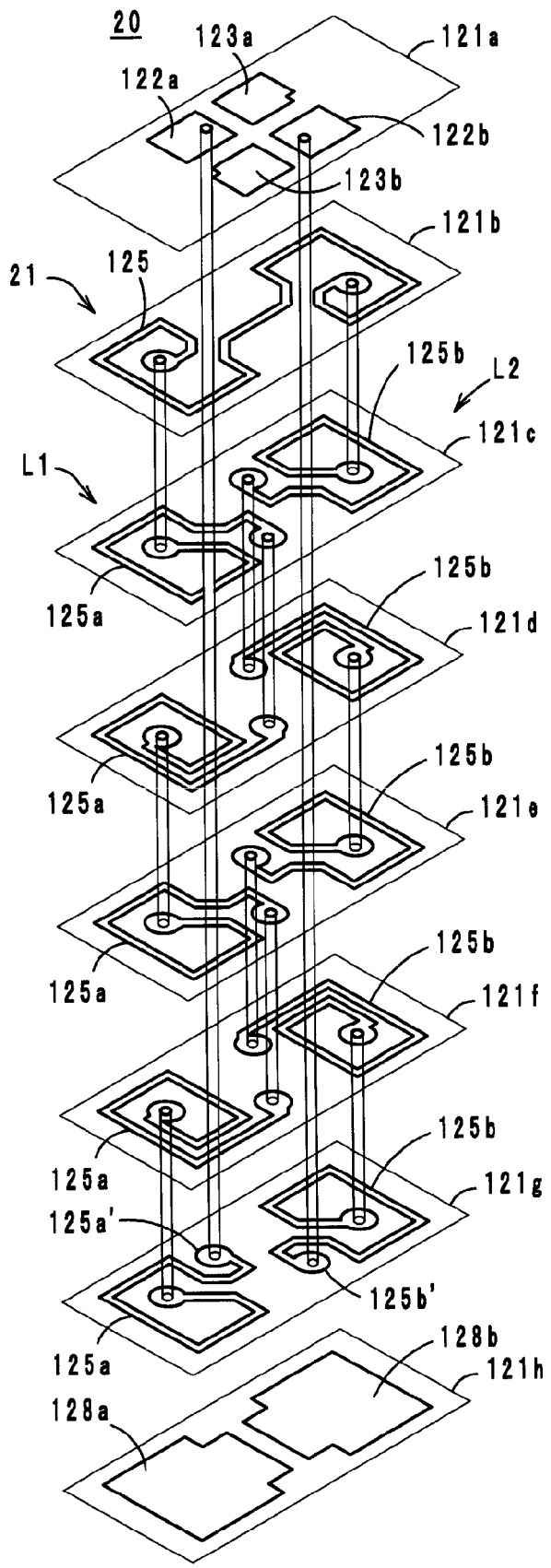
FIG. 14 is a perspective view illustrating a lamination structure of a feeder circuit substrate of a radio frequency IC device according to an eighth preferred embodiment of the present invention.

A radio frequency IC device according to an eighth preferred embodiment includes the feeder circuit substrate 20 illustrated in FIG. 14. This feeder circuit 21 preferably is basically the same as that of the fifth preferred embodiment (see FIG. 11). That is, feeder terminal electrodes 122a and 122b and mount electrodes 123a and 123b are disposed on a sheet 121a, and wiring electrodes 125a and 125b are disposed on each of sheets 121b to 121g. Furthermore, flat electrodes 128a and 128b are placed on a sheet 121h.

The inductance elements L1 and L2 are formed by spirally connecting the wiring electrodes 125a and 125b, which are integrated in a wiring electrode 1 125 on the sheet 121b. An end portion 125a' of the wiring electrode 125a on the sheet 121g connects to the feeder terminal electrode 122a, and an end portion 125b' of the wiring electrode 125b on the sheet 121g connects to the feeder terminal electrode 122b.

Figure 15:
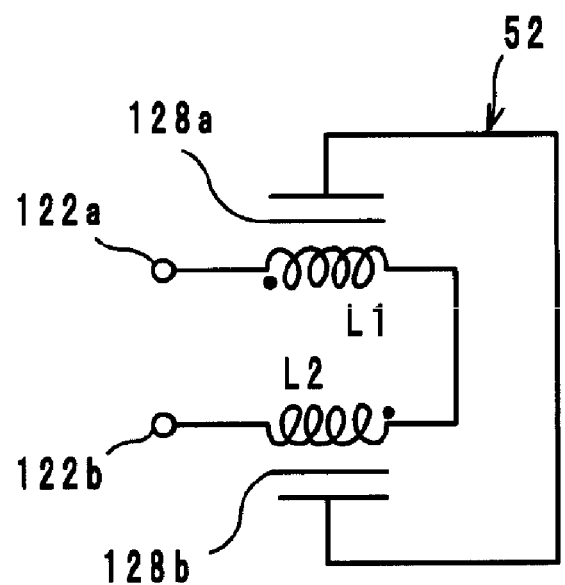
FIG. 15 is an equivalent circuit diagram of the feeder circuit substrate illustrated in FIG. 14.

The feeder circuit 21 having the above-described configuration including the inductance elements L1 and L2 has the equivalent circuit illustrated in FIG. 15. The inductance elements L1 and L2, which connect to the radio frequency IC chip 10 in series, magnetically couple to each other in opposite phases and resonate with frequencies processed by the radio frequency IC chip 10, and also electromagnetically couple to a radiating plate 52 (or the radiating plate 32). Also, the feeder circuit 21 realizes matching between the impedance of the radio frequency IC chip 10 (normally about 50 Ω) and the impedance of the radiating plate 32 or 52 (spatial impedance of about 377 Ω).

Thus, the operation and effect of the eighth preferred embodiment are the same as those of the first preferred embodiment. Particularly, variations in coupling between the feeder circuit 21 and the radiating plate 32 or 52 can be prevented by providing the flat electrodes 128a and 128b on the rear surface of the feeder circuit substrate 20. The flat electrodes 128a and 128b are not always necessary.

Furthermore, in the eighth preferred embodiment, the positions where the end portions of the inductance elements L1 and L2 connect to the feeder terminal electrodes 122a and 122b can be changed and the end portions 125a' and 125b' can be electrically open so as to constitute an auxiliary matching circuit.

Figure 16:
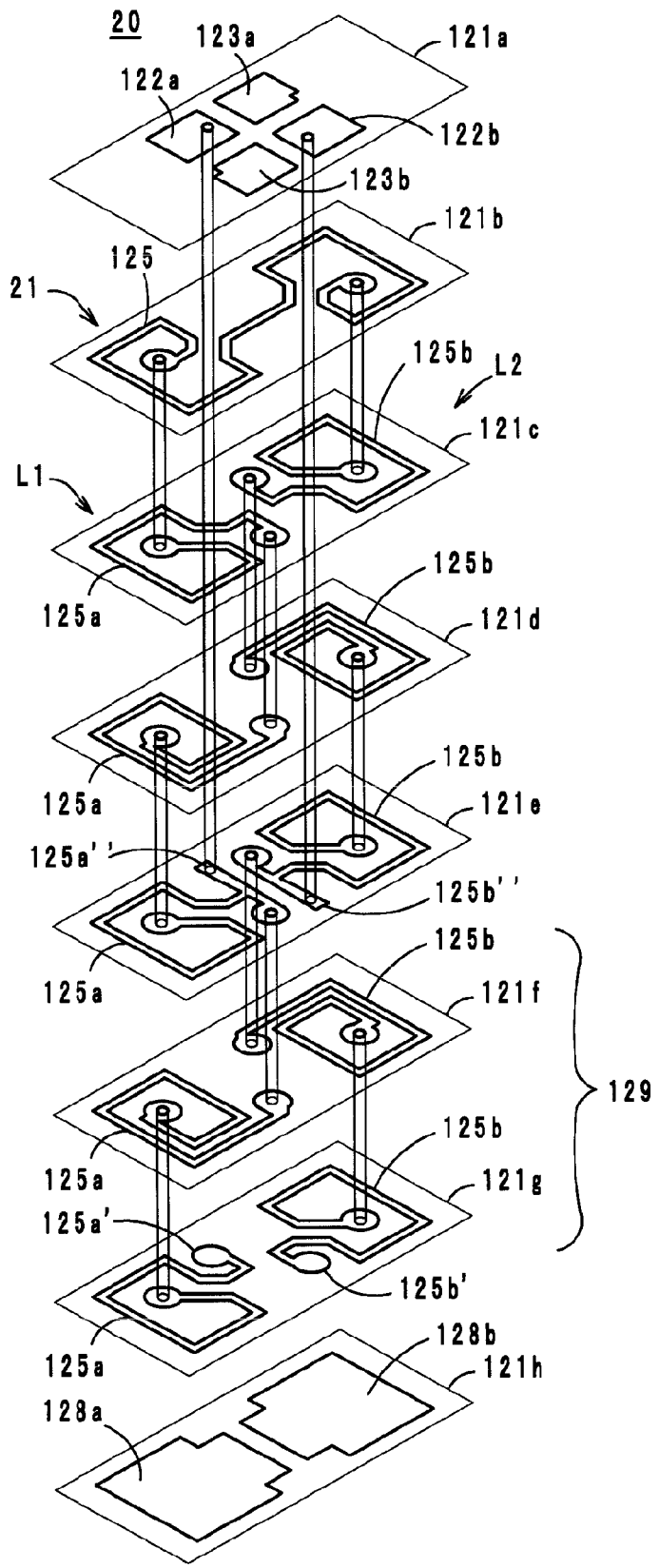
FIG. 16 is a perspective view illustrating another lamination structure of the feeder circuit substrate of the radio frequency IC device according to the eighth preferred embodiment of the present invention.
Figure 17:
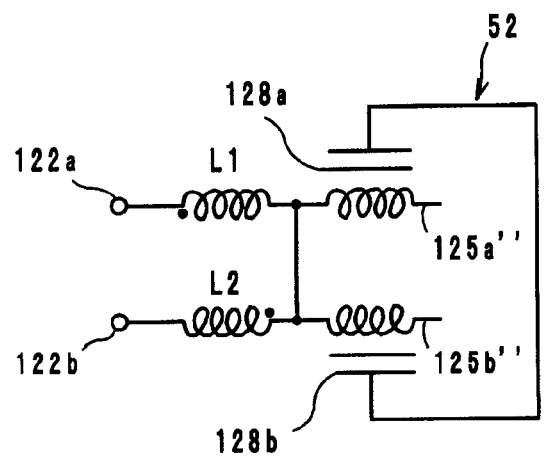
FIG. 17 is an equivalent circuit diagram of the feeder circuit substrate illustrated in FIG. 16.

For example, as illustrated in FIG. 16, leading electrodes 125a" and 125b" are provided to the wiring electrodes 125a and 125b on the sheet 121e, and the leading electrodes 125a" and 125b" are connected to the feeder terminal electrodes 122a and 122b. Then, the end portions 125a' and 125b' of the wiring electrodes 125a and 125b on the sheet 121g are electrically open, and an auxiliary matching circuit 129 is defined by the wiring electrodes 125a and 125b on the sheets 121f and 121g. The leading electrodes 125a" and 125b" connected to the feeder terminal electrodes 122a and 122b may be provided to any of the wiring electrodes 125a and 125b placed on the sheets 121c to 121f. The equivalent circuit thereof is illustrated in FIG. 17. By forming the auxiliary matching circuit 129, a matching state can be finely adjusted.

Figure 18:
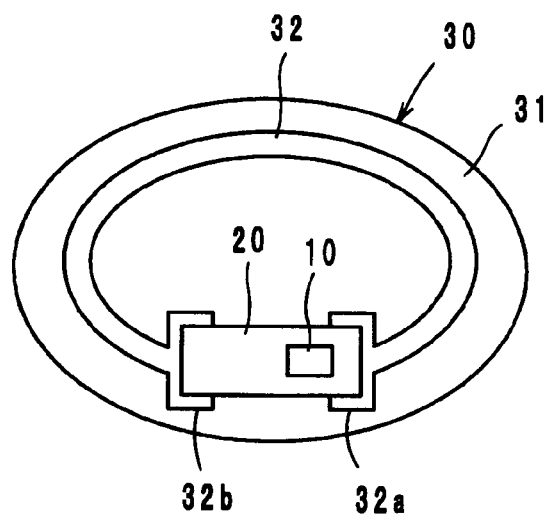
FIG. 18 is a perspective view illustrating a radio frequency IC device according to a ninth preferred embodiment of the present invention.
Figure 19:
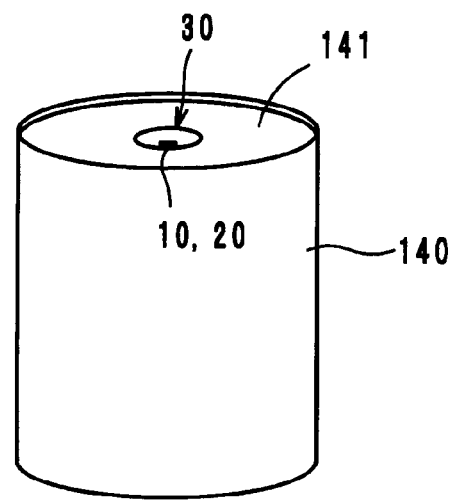
FIG. 19 is a perspective view showing a can including the radio frequency IC device according to the tenth preferred embodiment of the present invention.
Figure 20:
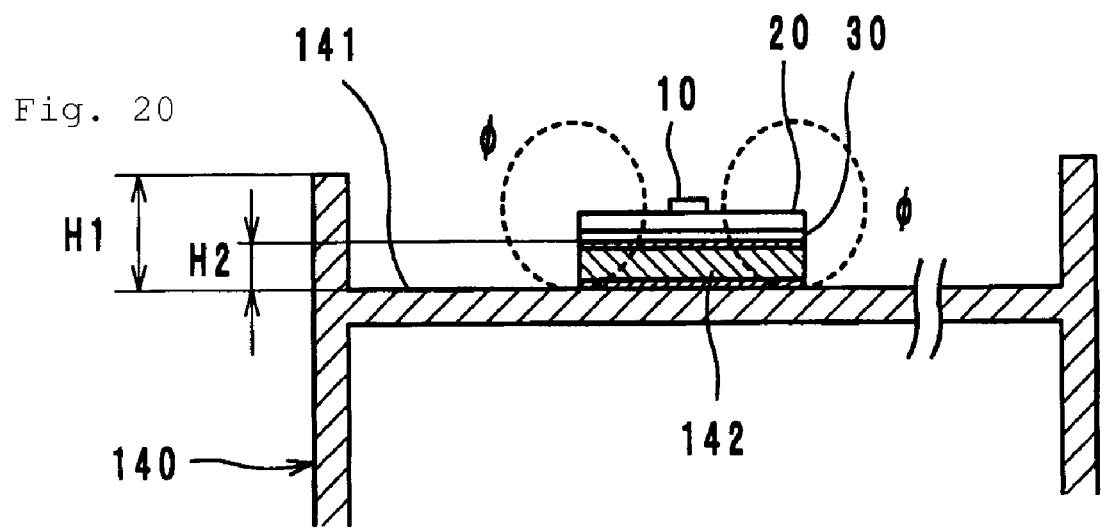
FIG. 20 is a cut-away view showing a can including the radio frequency IC device according to the tenth preferred embodiment of the present invention.

Ninth Preferred Embodiment (FIGS. 18 to 20)

A radio frequency IC device according to a ninth preferred embodiment includes the feeder circuit substrate 20 that is provided with the radio frequency IC chip 10 and that is bonded onto the radiating substrate 30 as illustrated in FIG. 18, and is bonded to a recessed portion 141 on a front or rear surface of a metallic can 140 as illustrated in FIG. 19. The metallic can 140 is preferably made of a metallic material, such as steel or aluminum, for example. The feeder circuit substrate 20 is the same as that in the first preferred embodiment and includes the feeder circuit 21 illustrated in FIG. 4. The radiating substrate 30 includes the loop-shaped radiating plate 32 having the end portions 32a and 32b placed on the film substrate 31 illustrated in FIGS. 2A and 2B. Note that the film substrate 31 and the radiating plate 32 illustrated in FIGS. 2A and 2B are rectangular, whereas those in the ninth preferred embodiment are preferably oval-shaped as illustrated in FIG. 18.

As illustrated in FIG. 20, the radiating substrate 30 provided with the radio frequency IC chip 10 and the feeder circuit substrate 20 is bonded to the bottom of the recessed portion 141 through a mat 142 of which both surfaces are applied with an adhesive. The depth H1 of the recessed portion 141 is preferably about 5 mm, the height H2 from the bottom of the recessed portion 141 to the radiating plate 32 is preferably about 2 mm to about 3 mm, for example. Preferably, the radio frequency IC chip 10 should not protrude from the recessed portion 141.

The operation and effect of the ninth preferred embodiment are the same as those of the first preferred embodiment. Incidentally, a magnetic field φ (see FIG. 20) is generated around the loop-shaped radiating plate 32 during transmission/reception of signals. This magnetic field does not pass through metal. Thus, if metal and the loop-shaped radiating plate 32 are arranged parallel or substantially parallel and are close to each other, a magnetic field generated by the radiating plate 32 is blocked by the metal and is not sufficiently radiated to the outside, which impairs the function of the radio frequency IC device. In the ninth preferred embodiment, the radiating plate 32 is spaced apart from the bottom of the recessed portion 141 of the metallic can 140 by about several mm through the mat 142 or the like, so that the magnetic field φ can be radiated from the radiating plate 32 and that the radio frequency IC device can function.

Alternatively, the radiating substrate 30 provided with the feeder circuit substrate 20 may be embedded in the mat 142. Furthermore, the radiating substrate 30 may have a thickness comparable to that of the mat 142, and the feeder circuit substrate 20 may be embedded in a recessed portion defined in the radiating substrate 30. Alternatively, the radio frequency IC chip 10 may be sandwiched by the feeder circuit substrate 20 and the radiating substrate 30. With this configuration, the radio frequency IC chip 10 and the feeder circuit substrate 20 can be protected against a drop or impact, and the mechanical strength of the radio frequency IC device can be enhanced. The radio frequency IC device is bonded to the metallic can 140 in this preferred embodiment. Other than the metallic can, any article made of a metallic material may be used, e.g., a metallic case or a ground electrode on the circuit substrate.

Tenth Preferred Embodiment (FIGS. 21 to 23B)

The radio frequency IC device according to each of the above-described preferred embodiments preferably includes a feeder circuit substrate including a feeder circuit having a resonance circuit and/or a matching circuit. However, the feeder circuit substrate is unnecessary in the radio frequency IC device. A feeder circuit having a resonance circuit and/or a matching circuit including at least two inductance elements may be provided on a rear surface (front surface) where input/output terminal electrodes of a radio frequency IC chip are placed. Hereinafter, such a radio frequency IC device is described as tenth and eleventh preferred embodiments.

Figure 21:
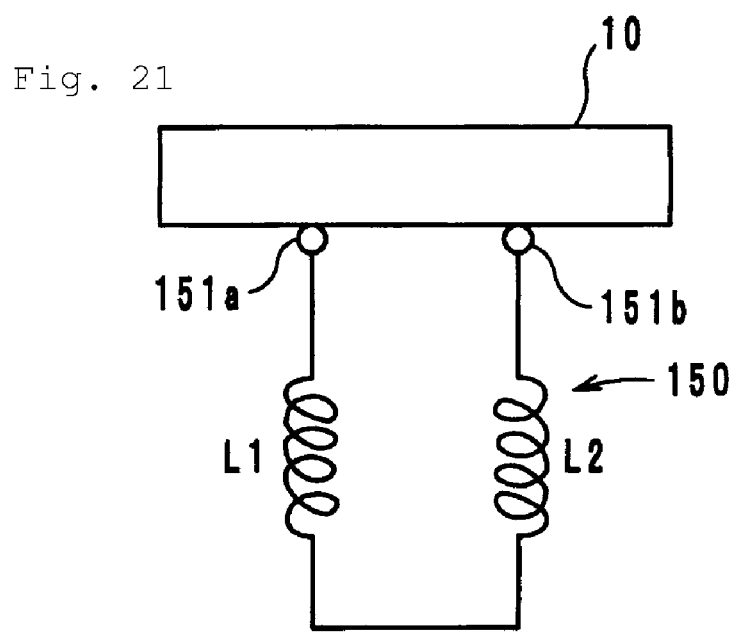
FIG. 21 is an equivalent circuit diagram of the feeder circuit substrate according to a tenth preferred embodiment of the present invention.

In a radio frequency IC device according to the tenth preferred embodiment, a feeder circuit 150 illustrated in an equivalent circuit diagram in FIG. 21 is provided on a rear surface of the radio frequency IC chip 10. The feeder circuit 150 includes two inductance elements L1 and L2, arranged in spiral patterns wound in opposite directions, connected in series. Feeder terminal electrodes 151a and 151b provided at one ends of the respective inductance elements L1 and L2 are in electrical conduction with the input/output terminal electrodes of the radio frequency IC chip 10. The inductance elements L1 and L2 magnetically couple to each other in opposite phases, define a resonance circuit together with stray capacitance between the coils, the resonance circuit resonating at frequencies processed by the radio frequency IC chip 10, and electromagnetically couple to a radiating plate (e.g., the end portions 32a and 32b of the radiating plate 32 illustrated in FIGS. 2A and 2B). Therefore, the operation and effect of the tenth preferred embodiment are the same as those of the first preferred embodiment.

In the feeder circuit 150, a midpoint between the inductance elements L1 and L2 serves as a virtual ground. An impedance value of the feeder circuit 150 is designed to be a complex conjugate with respect to an impedance value of the radio frequency IC chip 10. The inductance elements L1 and L2 are formed in a laminated state as illustrated in FIGS. 22A to 22G, and thus the inductance values thereof vary in accordance with a distance to the radiating plate. Then, an insulating layer 159 is placed on the rear surface of the radio frequency IC chip 10 so as to fix the distance to the radiating plate and to protect the inductance elements L1 and L2.

Figure 22A:
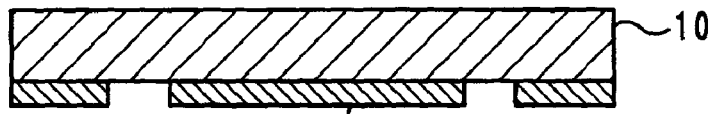
FIGS. 22A-22G are cut-away views showing a manufacturing process of a circuit substrate according to the tenth preferred embodiment of the present invention.
Figure 22B:
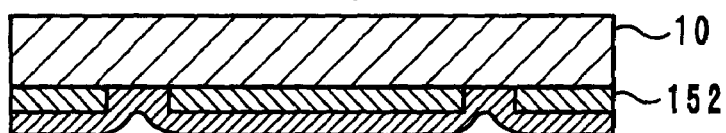
Figure 22C:
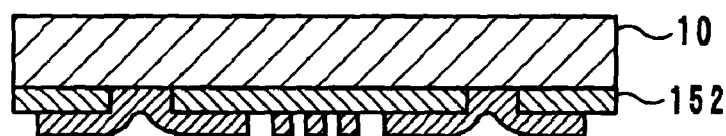

The feeder circuit 150 is fabricated in a process illustrated in FIGS. 22A to 22G. First, as illustrated in FIG. 22A, an insulating layer 152 is formed on the rear surface of the radio frequency IC chip 10 except a portion of the input/output terminal electrodes. Then, as illustrated in FIG. 22B, an electrode layer 153 is formed on the insulating layer 152 by, for example, plating or the like, and etching is performed in a predetermined shape (see FIG. 22C). This state is illustrated in FIG. 23A.

Figure 22D:
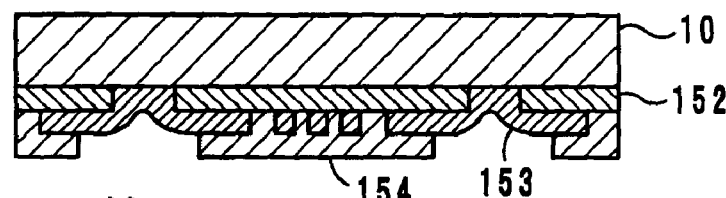
Figure 22E:
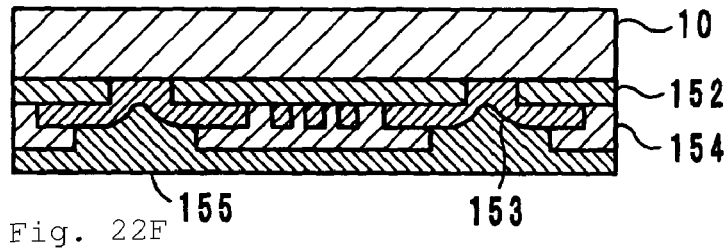
Figure 22F:
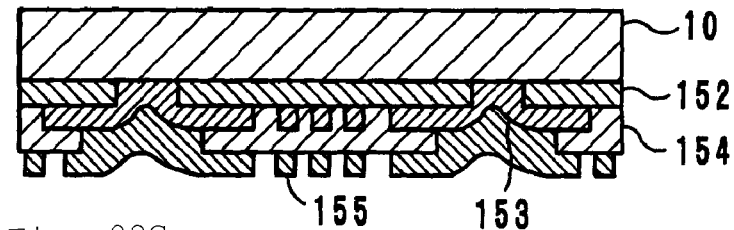
Figure 22G:
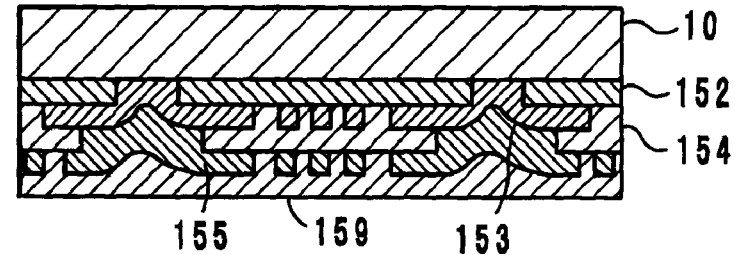

Then, as illustrated in FIG. 22D, an insulating layer 154 is formed on the electrode layer 153. Furthermore, as illustrated in FIG. 22E, an electrode layer 155 is formed on the insulating layer 154 by plating or the like, and etching is performed in a predetermined shape (see FIG. 22F). This state is illustrated in FIG. 23B. Furthermore, as illustrated in FIG. 22G, an insulating layer 159 is formed on the electrode layer 155.

Eleventh Preferred Embodiment (FIGS. 24 to 26C)

In a radio frequency IC device according to the eleventh preferred embodiment, the feeder circuit 150 illustrated in an equivalent circuit diagram in FIG. 24 is provided on the rear surface of the radio frequency IC chip 10. This feeder circuit 150 is defined by inserting a capacitor C between the inductance elements L1 and L2 in the equivalent circuit (see FIG. 21) according to the tenth preferred embodiment, to define a series resonance circuit. The operation and effect of the eleventh preferred embodiment is the same as those of the tenth preferred embodiment.

Figure 25A:
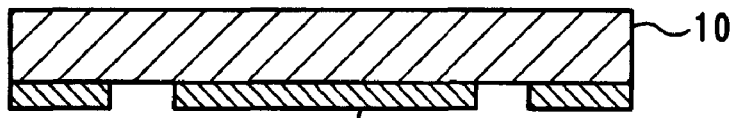
FIGS. 25A-25G are cut-away views showing a manufacturing process of a circuit substrate according to the eleventh preferred embodiment of the present invention.
Figure 25B:
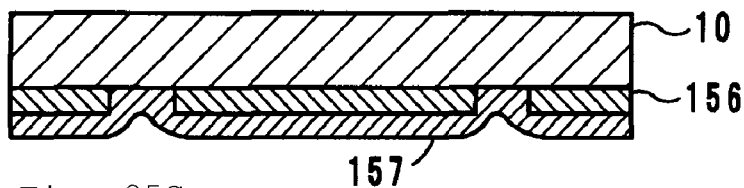
Figure 25C:
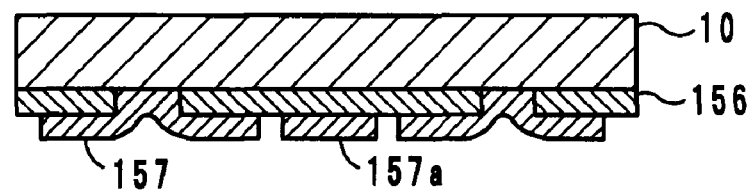

The feeder circuit 150 illustrated in FIG. 24 is fabricated in a process illustrated in FIGS. 25A to 25G. First, as illustrated in FIG. 25A, an insulating layer 156 is formed on the rear surface of the radio frequency IC chip 10 except a portion of the input/output terminal electrodes. Then, as illustrated in FIG. 25B, an electrode layer 157 is formed on the insulating layer 156 by, for example, plating or the like, and etching is performed in a predetermined shape (see FIG. 25C). This state is illustrated in FIG. 26A. An electrode 157a formed at a center portion serves as one capacitor electrode.

Figure 25D:
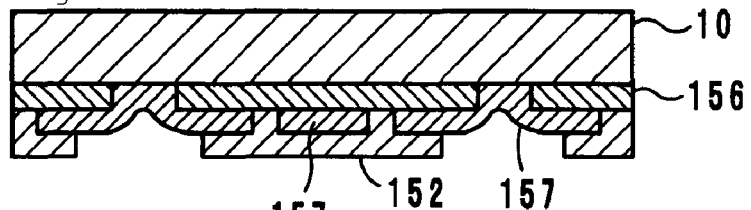
Figure 25E:
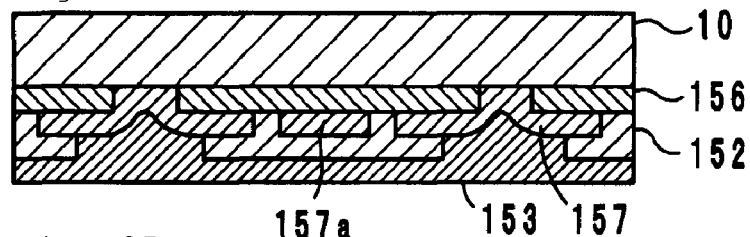
Figure 25F:
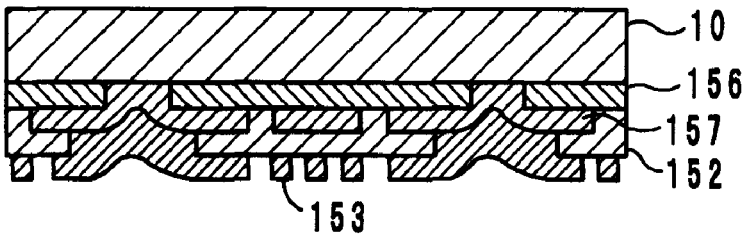
Figure 26A:
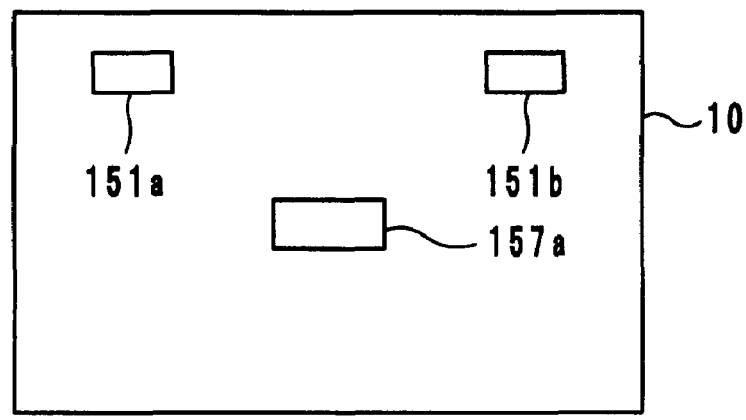
FIG. 26A-26C are plan views showing a layout of a radio frequency IC device according to the eleventh preferred embodiment of the present invention.
Figure 26B:
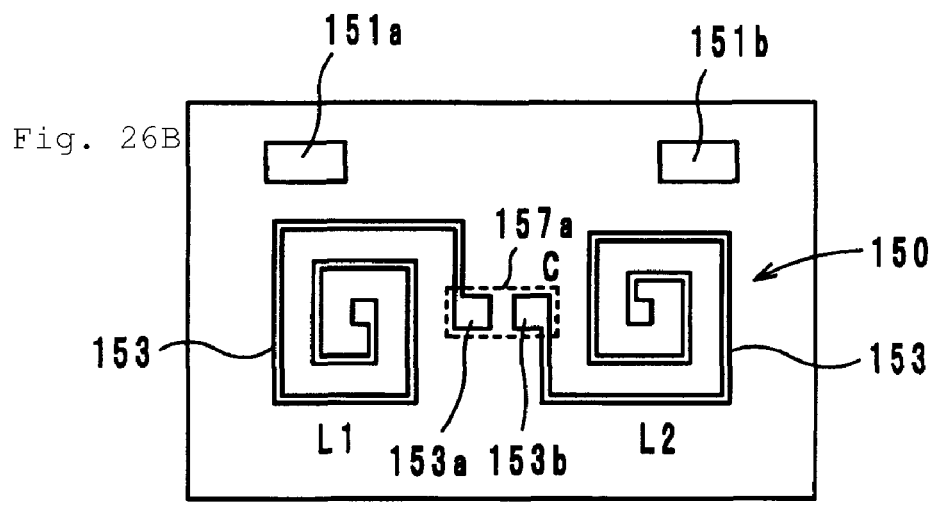
Figure 26C:
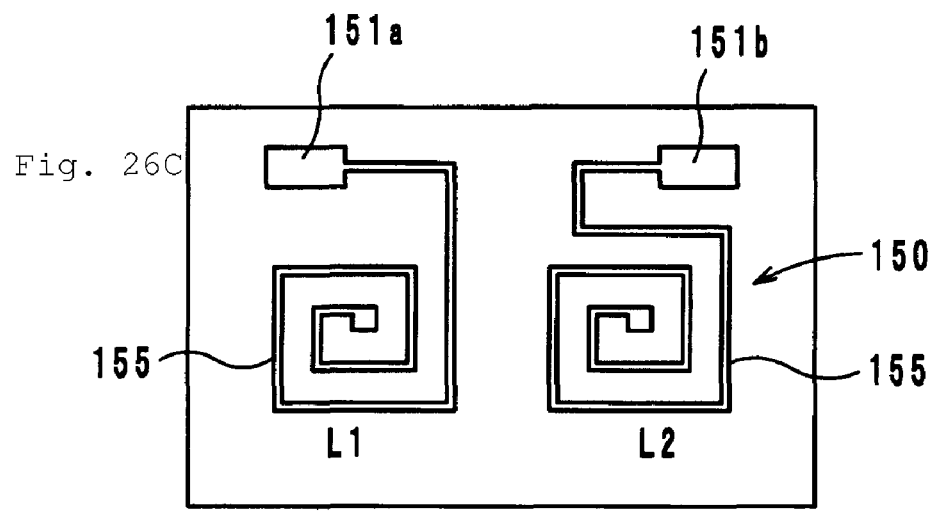

Then, as illustrated in FIG. 25D, an insulating layer 152 is formed on the electrode layer 157. Furthermore, as illustrated in FIG. 25E, an electrode layer 153 is formed on the insulating layer 152 by plating or the like, and etching is performed in a predetermined shape (see FIG. 25F). This state is illustrated in FIG. 26B. At this time, electrodes 153a and 153b facing the capacitor electrode 157a are formed.

Figure 25G:
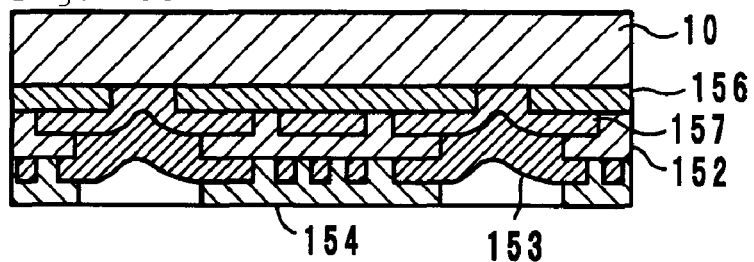

Furthermore, as illustrated in FIG. 25G, an insulating layer 154 is formed on the electrode layer 153. Then, as illustrated in FIGS. 22E, 22F, and 22G, the electrode layer 155 and the insulating layer 159 are formed. The state where the electrode layer 155 is formed is illustrated in FIG. 123C.

Twelfth to Fifteenth Preferred Embodiments (See FIGS. 27A to 31D)

Figure 27A:
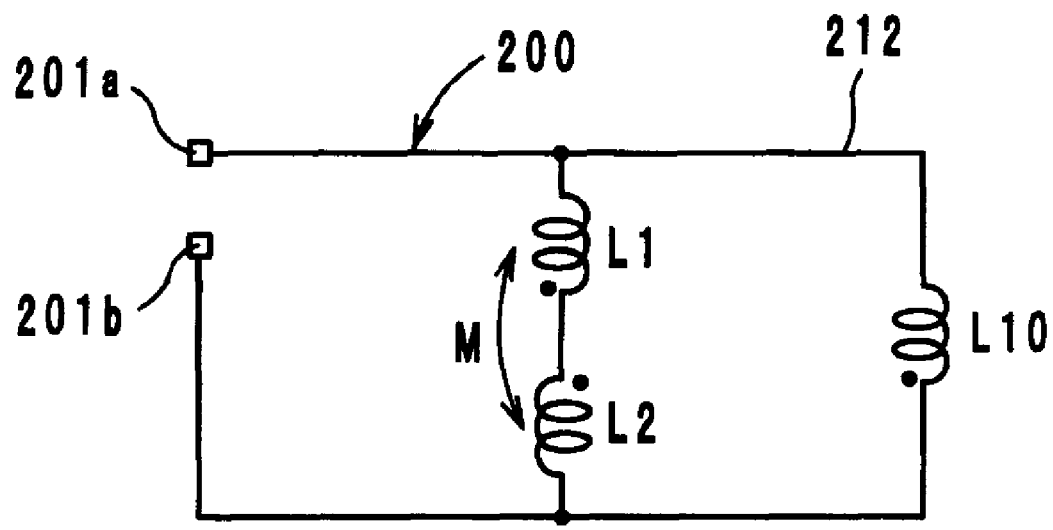
FIGS. 27A and 27B are equivalent circuit diagrams of the feeder circuit substrate according to a twelfth preferred embodiment and a thirteenth preferred embodiment of the present invention, respectively.

A radio frequency IC device according to a twelfth preferred embodiment includes a feeder circuit 200 including inductance elements L1 and L2, arranged in spiral patterns wound in opposite directions, connected in series, as illustrated in an equivalent circuit diagram in FIG. 27A. Both ends of a radiating plate 212 constituted by a loop-shaped electrode having an inductance component L10 are in electrical conduction with both ends of the inductance elements L1 and L2. Also, feeder terminal electrodes 201a and 201b that connect to the input/output terminal electrodes of the radio frequency IC chip 10 are provided at both ends of the feeder circuit 200.

Figure 27B:
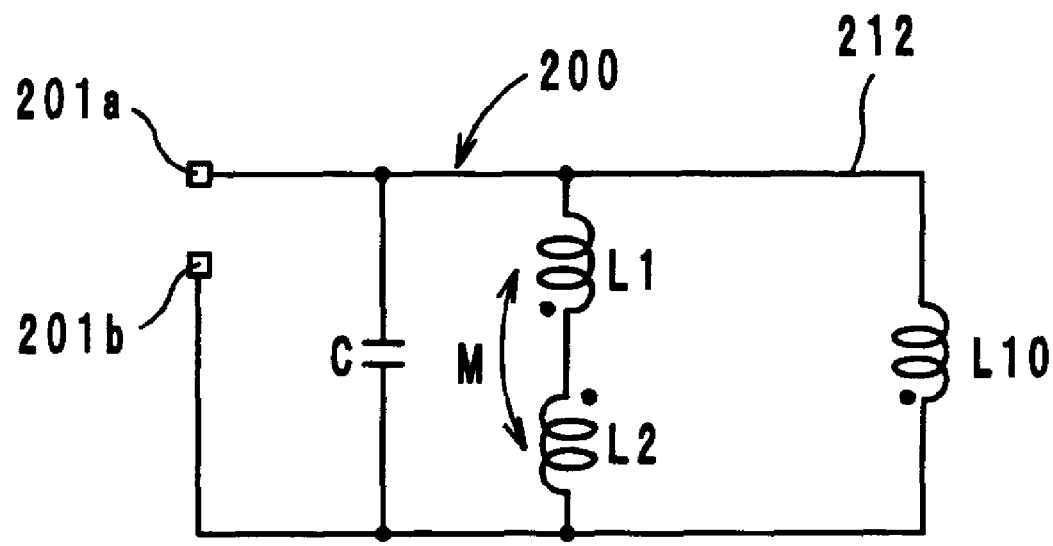

A radio frequency IC device according to a thirteenth preferred embodiment includes a capacitor C that connect in parallel to the inductance elements L1 and L2, as illustrated in an equivalent circuit diagram in FIG. 27B. Other than that, the configuration is preferably the same as that in the twelfth preferred embodiment.

Figure 28A:
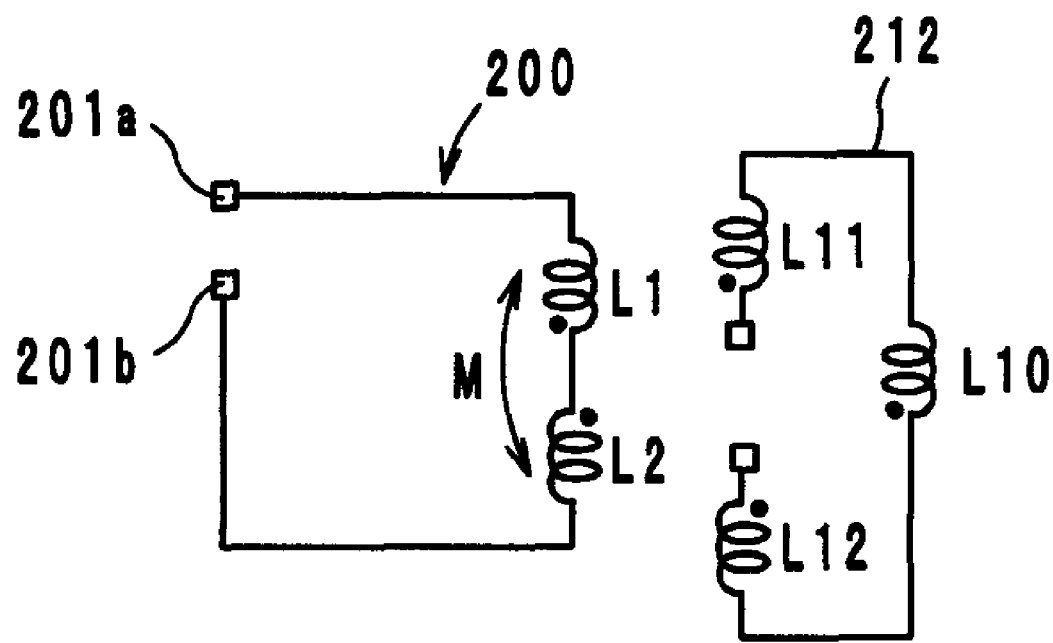
FIGS. 28A and 28B are equivalent circuit diagrams of the feeder circuit substrate according to a fourteenth preferred embodiment and a fifteenth preferred embodiment of the present invention, respectively.
Figure 28B:
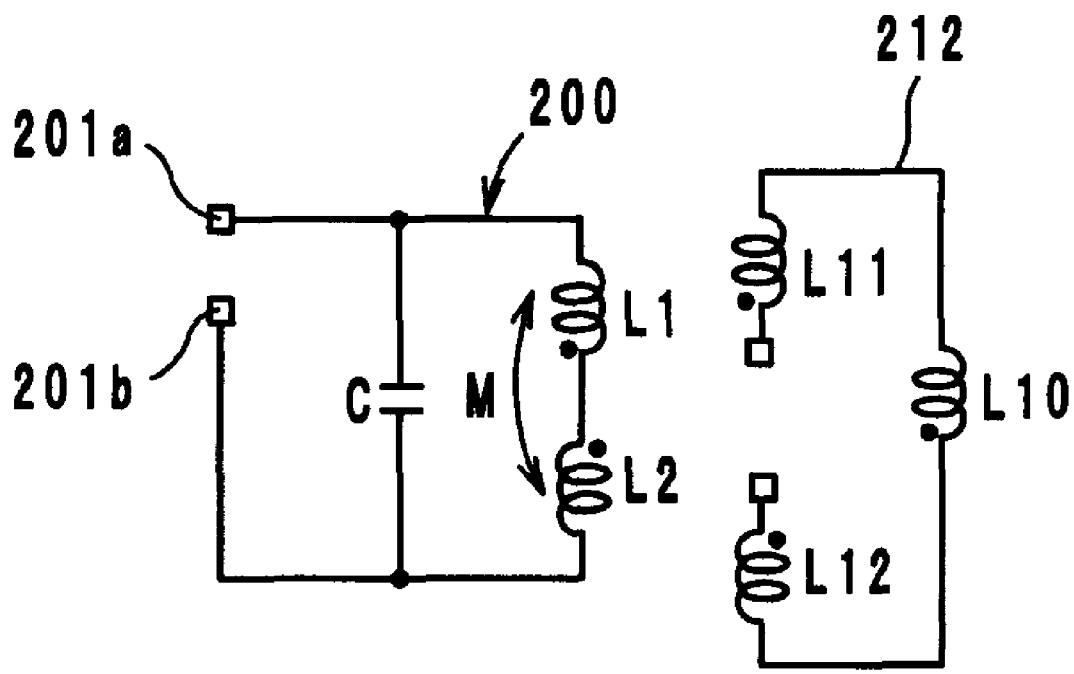

A radio frequency IC device according to a fourteenth preferred embodiment includes the feeder circuit 200 including the inductance elements L1 and L2, arranged in spiral patterns wound in opposite directions, connected in series, as illustrated in an equivalent circuit diagram in FIG. 28A. Spiral inductance components L11 and L12 provided at both ends of the radiating plate 212 constituted by the loop-shaped electrode having the inductance component L10 are electromagnetically coupled to the inductance elements L1 and L2. Also, the feeder terminal electrodes 201a and 201b that connect to the input/output terminal electrodes of the radio frequency IC chip 10 are provided at both ends of the feeder circuit 200.

A radio frequency IC device according to a fifteenth preferred embodiment includes a capacitor C that connect in parallel to the inductance elements L1 and L2, as illustrated in an equivalent circuit diagram in FIG. 125B. Other than that, the configuration is preferably the same as that in the fourteenth preferred embodiment.

In the fourteenth and fifteenth preferred embodiments, spiral receiving electrodes (the inductance components L11 and L12) are arranged at the both ends of the radiating plate 212 such that the receiving electrodes oppose the inductance elements L1 and L2 of the feeder circuit 200. With this arrangement, the direction of a magnetic field generated by the inductance component L10 of the radiating plate 212 is the same as that of a magnetic field generated by the feeder circuit 200, so that the degree of coupling between the feeder circuit 200 and the radiating plate 212 is increased.

Also, since the receiving electrodes (the inductance components L11 and L12) provided at the both ends of the radiating plate 212 have spiral patterns wound in opposite directions, energy passing efficiency increases. Furthermore, each of the inductance elements and each of the spiral ends of the radiating plate formed to couple to each other (L1 and L11, L2 and L12) are wound in the same directions, respectively, when the feeder circuit 200 is viewed in a perspective plan view. The directions of magnetic fields generated in the respective two spiral electrodes (L1 and L11, L2 and L12) placed to oppose each other in a perspective plan view are the same, so that the strength of magnetic coupling between the feeder circuit 200 and the radiating plate 212 increases.

Furthermore, the inductance value (L10) of the loop-shaped electrode of the radiating plate 212 is preferably set to be larger than the inductance value of the inductance elements L1 and L2 of the feeder circuit 200. Signals from the feeder circuit 200 can be transmitted/received through a magnetic field generated by the radiating plate 212, so that occurrence of communication failure with a reader/writer can be minimized.

Now, a specific configuration of the twelfth to fifteenth preferred embodiments illustrated in the equivalent circuit diagrams is described. As illustrated in FIGS. 29A to 29D, those radio frequency IC devices include the radio frequency IC chip 10, a feeder circuit substrate 220, and a radiating substrate 210 including the radiating plate 212 (see FIGS. 31A to 31D). The feeder terminal electrodes 201a and 201b are provided on a front surface of the feeder circuit substrate 220 (see FIG. 29B), and flat electrodes 202a and 202b are provided on a rear surface thereof (see FIG. 29C). The operation and effect of the flat electrodes 202a and 202b are as described in the second preferred embodiment (see FIG. 5). Alternatively, the flat electrodes 202a and 202b may be omitted as illustrated in FIG. 29D.

Figure 30:
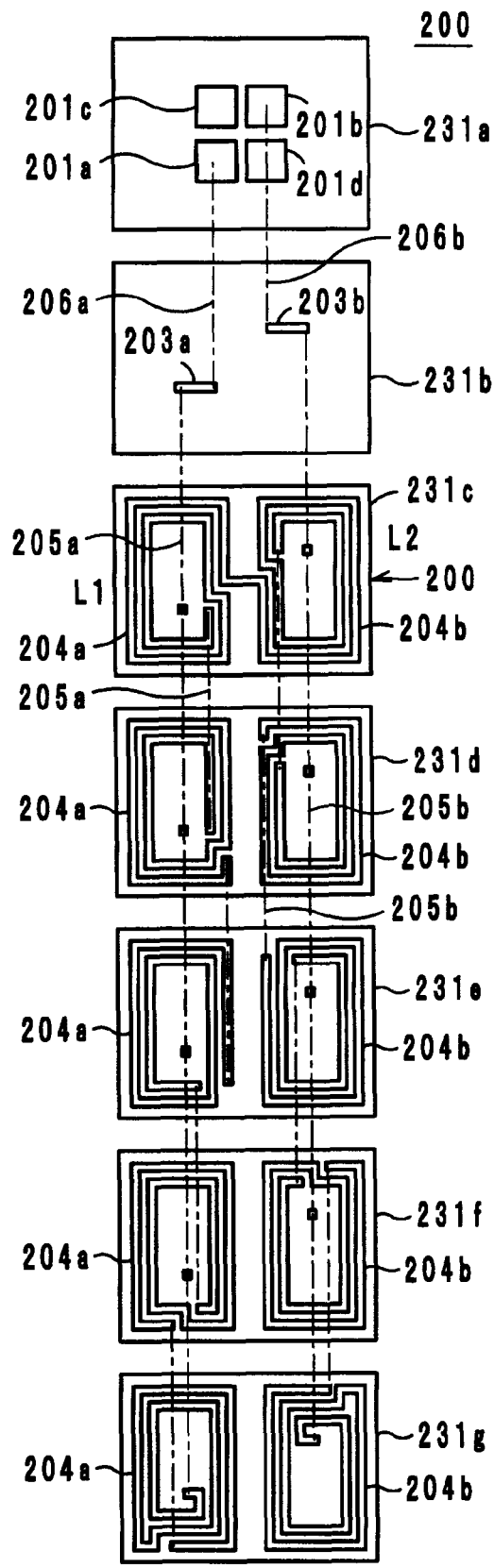
FIG. 30 is a perspective view illustrating a lamination structure of a feeder circuit substrate of a radio frequency IC device according to twelfth to fifteenth preferred embodiments of the present invention.

The feeder circuit 200 illustrated in FIG. 30 is provided inside the feeder circuit substrate 220. The feeder circuit substrate 220 is formed by, for example, laminating, crimping, and firing dielectric or magnetic ceramic sheets. A sheet 231a in the top layer is provided with the feeder terminal electrodes 201a and 201b and mount electrodes 201c and 201d. A sheet 231b in the second layer is provided with connecting electrodes 203a and 203b. Each of sheets 231c to 231g in the third to seventh layers is provided with wiring electrodes 204a and 204b defining the inductance elements L1 and L2.

By laminating the sheets 231a to 231g, the wiring electrodes 204a are spirally connected by via-hole conductors 205a to form the inductance element L1, while the wiring electrodes 204b are spirally connected by via-hole conductors 205b so as to form the inductance element L2. Individual ends of the inductance elements L1 and L2 (wiring electrodes 204a and 204b) are mutually connected in a conductive manner on the sheet 231c, and the other ends thereof are connected to the feeder terminal electrodes 201a and 201b through the connecting electrodes 203a and 203b and via-hole conductors 206a and 206b.

The operation and effect of the feeder circuit 200 having the above-described configuration are the same as those of the first and second preferred embodiments. Particularly, in the feeder circuit 200 illustrated in FIG. 30, individual ends of the two inductance elements L1 and L2 are mutually connected in a conducting manner near the top layer in the laminate and the other ends are connected to the radio frequency IC chip 10. Also, the inductance elements L1 and L2 are connected in a conducting manner near the top layer in the laminate apart from the radiating plate 212 and are wound in directions opposite to each other near a lower layer of the laminate where electromagnetic coupling with the radiating plate 212 is achieved. Accordingly, energy passing efficiency increases.

As illustrated in FIGS. 31A to 31D, the radiating substrate 210 includes the spiral radiating plate 212 that has one end 212a and another end 212b and that is provided on a front surface of a flexible resin film 211 and also includes an electrode 213 adjacent to the one end 212a. The electrode 213 is in electrical conduction with the other end 212b of the radiating plate 212 via a connecting electrode 214 placed on a rear surface of the substrate 211 and a via-hole conductor. Also, the feeder circuit substrate 220 on which the radio frequency IC chip 10 is mounted is coupled to the one end 212a of the radiating plate 212 and one end 213a of the electrode 213.

The one end 212a of the radiating plate 212 and the one end 213a of the electrode 213 may be flat as illustrated in FIG. 31B or may be spiral as illustrated in FIG. 31C. When the one end 212a of the radiating plate 212 and the one end 213a of the electrode 213 are spiral, which corresponds to the fourteenth and fifteenth preferred embodiments.

While preferred embodiments of the present invention have been described above, it is to be understood that variations and modifications will be apparent to those skilled in the art without departing the scope and spirit of the present invention. The scope of the present invention, therefore, is to be determined solely by the following claims.

What is claimed is:
1. A radio frequency IC device comprising:
a radio frequency IC;
a feeder circuit that is coupled to the radio frequency IC, the feeder circuit is provided on a principal surface provided with input/output terminal electrodes of the radio frequency IC, and includes a resonance circuit including at least two inductance elements and/or a matching circuit including at least two inductance elements; and a radiating plate arranged to radiate a transmission signal supplied from the feeder circuit and/or supply a received signal to the feeder circuit; wherein the feeder circuit is bonded to or placed near the radiating plate; and the at least two inductance elements include spiral patterns wound in opposite directions.

2. The radio frequency IC device according to claim 1, wherein individual ends of the at least two inductance elements are mutually connected in an electrically conductive manner near a top layer in a laminate and other ends of the at least two inductance elements are coupled to the radio frequency IC.

3. A radio frequency IC device comprising:
a radio frequency IC chip;
a feeder circuit substrate electrically connected to the radio frequency IC chip and provided with a feeder circuit including a resonance circuit including at least two inductance elements and/or a matching circuit including at least two inductance elements; and
a radiating plate arranged to radiate a transmission signal supplied from the feeder circuit and/or supply a received signal to the feeder circuit; wherein
the feeder circuit substrate is bonded to or placed near the radiating plate; and
the at least two inductance elements include spiral patterns wound in opposite directions.

4. The radio frequency IC device according to claim 3, wherein a resonance frequency of the transmission signal and/or the received signal substantially corresponds to a resonance frequency of the resonance circuit.

5. The radio frequency IC device according to claim 3, wherein the at least two inductance elements are in different positions when the feeder circuit substrate is viewed in a perspective plan view.

6. The radio frequency IC device according to claim 3, wherein each of the at least two inductance elements includes two wiring electrodes adjacent to each other on the same plane.

7. The radio frequency IC device according to claim 3, wherein the feeder circuit substrate includes a laminate and wherein an inside or a surface of a bottom layer of the laminate is provided with flat electrodes, a size of the laminate being about the same as or smaller than that of an outer shape of the at least two inductance elements when the feeder circuit substrate is viewed in a perspective plan view.

8. The radio frequency IC device according to claim 3, wherein
the feeder circuit substrate includes a magnetic substance; and
the at least two inductance elements are placed in the magnetic substance.

9. The radio frequency IC device according to claim 3, wherein the radiating plate is defined by a loop-shaped electrode having one end and another end and each of the one end and another end couples to one of the at least two inductance elements.

10. The radio frequency IC device according to claim 9, wherein the inductance elements and spiral end portions of the radiating plate that are arranged to couple to each other are wound in the same directions when the feeder circuit is viewed in a perspective plan view.

11. The radio frequency IC device according to claim 9, wherein an inductance value of the loop-shaped electrode is larger than an inductance value of the inductance elements of the feeder circuit.

12. The radio frequency IC device according to claim 9, wherein a magnetic substance is placed inside or on a surface of a loop of the loop-shaped electrode.

13. The radio frequency IC device according to claim 3, wherein the at least two inductance elements connect to the radio frequency IC chip in series.

14. The radio frequency IC device according to claim 3, wherein the at least two inductance elements connect to the radio frequency IC chip in parallel.

15. The radio frequency IC device according to claim 3, wherein inductance values of the at least two inductance elements are substantially the same.

16. The radio frequency IC device according to claim 3, wherein
a plurality of mount electrodes arranged to mount the radio frequency IC chip are placed on a principal surface of the feeder circuit substrate; and
at least two of the plurality of mount electrodes are electrically connected through the feeder circuit.

17. The radio frequency IC device according to claim 16, wherein the at least two mount electrodes are balanced input/output terminal electrodes.

18. The radio frequency IC device according to claim 3, wherein the feeder circuit includes an auxiliary matching circuit having one end electrically connected to a predetermined position of the feeder circuit and another end that is electrically open.

19. The radio frequency IC device according to claim 3, wherein
a portion of the at least two inductance elements is exposed on a side surface of the feeder circuit substrate; and
the exposed portion also defines as a radiating plate.

20. The radio frequency IC device according to claim 3, wherein the feeder circuit substrate is a multilayer substrate made of ceramic or resin.

21. The radio frequency IC device according to claim 3, wherein the feeder circuit substrate is a flexible substrate.

* * * * *

UNITED STATES PATENT AND TRADEMARK OFFICE
Certificate

Patent No. 7,990,337 B2                                                                     Patented: August 2, 2011

On petition requesting issuance of a certificate for correction of inventorship pursuant to 35 U.S.C. 256, it has been found that the above identified patent, through error and without any deceptive intent, improperly sets forth the inventorship.

Accordingly, it is hereby certified that the correct inventorship of this patent is: Noboru Kato, Moriyama (JP); Jun Sasaki, Kyoto (JP); and Kosuke Yamada, Nagaokakyo (JP).

Signed and Sealed this Twenty-first Day of February 2012.

JACOB Y. CHOI
*Supervisory Patent Examiner*
Art Unit 2821
Technology Center 2800